United States Patent
Kitai

(10) Patent No.: US 11,645,016 B2
(45) Date of Patent: May 9, 2023

(54) IMAGE FORMING SYSTEM, INSPECTION DEVICE, AND INSPECTION METHOD

(71) Applicant: Tadashi Kitai, Kanagawa (JP)

(72) Inventor: Tadashi Kitai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/571,539

(22) Filed: Jan. 10, 2022

(65) Prior Publication Data

US 2022/0300219 A1    Sep. 22, 2022

(30) Foreign Application Priority Data

Mar. 19, 2021  (JP) .............................. JP2021-046488

(51) Int. Cl.
*G06K 15/00* (2006.01)
*G06F 3/12* (2006.01)

(52) U.S. Cl.
CPC ............ *G06F 3/1207* (2013.01); *G06F 3/121* (2013.01); *G06F 3/1234* (2013.01); *G06F 3/1253* (2013.01); *G06F 3/1259* (2013.01)

(58) Field of Classification Search
CPC ...... G06F 3/1207; G06F 3/121; G06F 3/1234; G06F 3/1253; G06F 3/1259; G03G 15/5025; G03G 15/507; G03G 15/55; G03G 15/655; G03G 15/5016
See application file for complete search history.

(56) References Cited

U.S. PATENT DOCUMENTS

| | | | |
|---|---|---|---|
| 9,823,884 B2 * | 11/2017 | Kitai | ................... G06V 10/993 |
| 2013/0016374 A1 | 1/2013 | Kawamoto et al. | |
| 2013/0250319 A1 | 9/2013 | Kaneko et al. | |
| 2013/0250377 A1 | 9/2013 | Kitai et al. | |
| 2014/0079293 A1 | 3/2014 | Kitai et al. | |
| 2014/0268259 A1 | 9/2014 | Kitai | |

(Continued)

FOREIGN PATENT DOCUMENTS

| | | |
|---|---|---|
| JP | 2005-205747 | 8/2005 |
| JP | 2010-002463 | 1/2010 |

(Continued)

OTHER PUBLICATIONS

Extended European Search Report dated May 23, 2022 in European Patent Application No. 21218394.1, 9 pages.

*Primary Examiner* — Huo Long Chen
(74) *Attorney, Agent, or Firm* — Xsensus LLP

(57) ABSTRACT

An image processing system includes an image forming device, a sensor, processing circuitry, and an ejection device. The image forming device forms an image based on print information, on a first conveyance medium. The sensor acquires information about the image formed on the first conveyance medium. The processing circuitry causes a second conveyance medium to be ejected in a case where the image formed on the first conveyance medium is a defective image, based on the acquired information. The ejection device stacks the first conveyance medium and the second conveyance medium. The processing circuitry controls display of identification information that distinguishes and associates each one of a plurality of first conveyance media having defective images, with a corresponding one of a plurality of second conveyance media.

14 Claims, 27 Drawing Sheets

(56) References Cited

U.S. PATENT DOCUMENTS

| | | |
|---|---|---|
| 2014/0285852 A1 | 9/2014 | Aikawa et al. |
| 2014/0313538 A1 | 10/2014 | Kitai et al. |
| 2015/0269719 A1 | 9/2015 | Kitai |
| 2017/0031636 A1 | 2/2017 | Kitai |
| 2018/0157446 A1* | 6/2018 | Fukuda .................. G06K 15/16 |
| 2020/0314274 A1 | 10/2020 | Hasegawa et al. |

FOREIGN PATENT DOCUMENTS

| | | | | |
|---|---|---|---|---|
| JP | 2012-236343 | | 12/2012 | |
| JP | 2014-184649 A | | 10/2014 | |
| JP | 2014184649 A | * | 10/2014 | .......... B41F 33/0036 |
| JP | 2017-034298 | | 2/2017 | |
| JP | 2019-089268 | | 6/2019 | |
| JP | 2019089268 A | * | 6/2019 | |

* cited by examiner

FIG. 8

| ITEMS | REMARKS | INITIAL VALUE |
|---|---|---|
| JOB GENERATION SOURCE | DFE JOB, INTERNAL JOB | INITIALIZED BY GENERATION SOURCE |
| GENERATION TIME | TIME WHEN GENERATION SOURCE GENERATED JOB | INITIALIZED BY GENERATION SOURCE |
| PAGE ID | IDENTIFICATION INFORMATION OF PRINT PAGE, INCREMENTED BY ONE FOR OUTPUT OF EACH PAGE STARTING FROM ACTIVATION OF THE POWER SOURCE | 0 |
| PRINT FACE | ONE SIDE IN SINGLE-SIDED PRINTING, FRONT FACE IN DUPLEX PRINTING, BACK FACE IN DUPLEX PRINTING | INITIALIZED BY GENERATION SOURCE |
| SHEET ID | IDENTIFICATION INFORMATION OF PRINT SHEET, INCREMENTED BY ONE FOR OUTPUT OF EACH SHEET STARTING FROM ACTIVATION OF THE POWER SOURCE | 0 |
| COPY ID | IDENTIFICATION INFORMATION OF COPY UNIT, INCREMENTED BY ONE FOR OUTPUT OF EACH COPY STARTING FROM ACTIVATION OF THE POWER SOURCE | 0 |
| JOB ID | IDENTIFICATION INFORMATION OF JOB UNIT, INCREMENTED BY ONE FOR OUTPUT OF EACH JOB STARTING FROM ACTIVATION OF THE POWER SOURCE | 0 |
| SHEET TYPE | TYPE OF SHEETS | INITIALIZED BY GENERATION SOURCE |
| SHEET SIZE | SIZE OF SHEETS | INITIALIZED BY GENERATION SOURCE |
| JOB TYPE | TARGET OF DEFECT DETECTION, NON-TARGET OF DEFECT DETECTION, SLIP SHEET FOR DEFECT DETECTION IDENTIFICATION | INITIALIZED BY GENERATION SOURCE |
| SLIP SHEET ID | SLIP SHEET ID NOTIFIED FROM INSPECTION DEVICE | INITIALIZED BY GENERATION SOURCE |
| ... | ... | ... |

| PATTERN NUMBER | CONTENTS |
|---|---|
| 0 | RED AND YELLOW |
| 1 | YELLOW AND GREEN |
| 2 | GREEN AND LIGHT BLUE |
| 3 | LIGHT BLUE AND BLUE |
| 4 | BLUE AND PINK |
| 5 | PINK AND RED |

FIG. 10

| SLIP SHEET ID | CONTENTS |
|---|---|
| 0000 | RED AND YELLOW |
| 0001 | YELLOW AND GREEN |
| 0002 | GREEN AND LIGHT BLUE |
| 0003 | LIGHT BLUE AND BLUE |
| 0004 | BLUE AND PINK |
| 0005 | PINK AND RED |
| 0006 | RED AND YELLOW |
| 0007 | YELLOW AND GREEN |
| ... | ... |

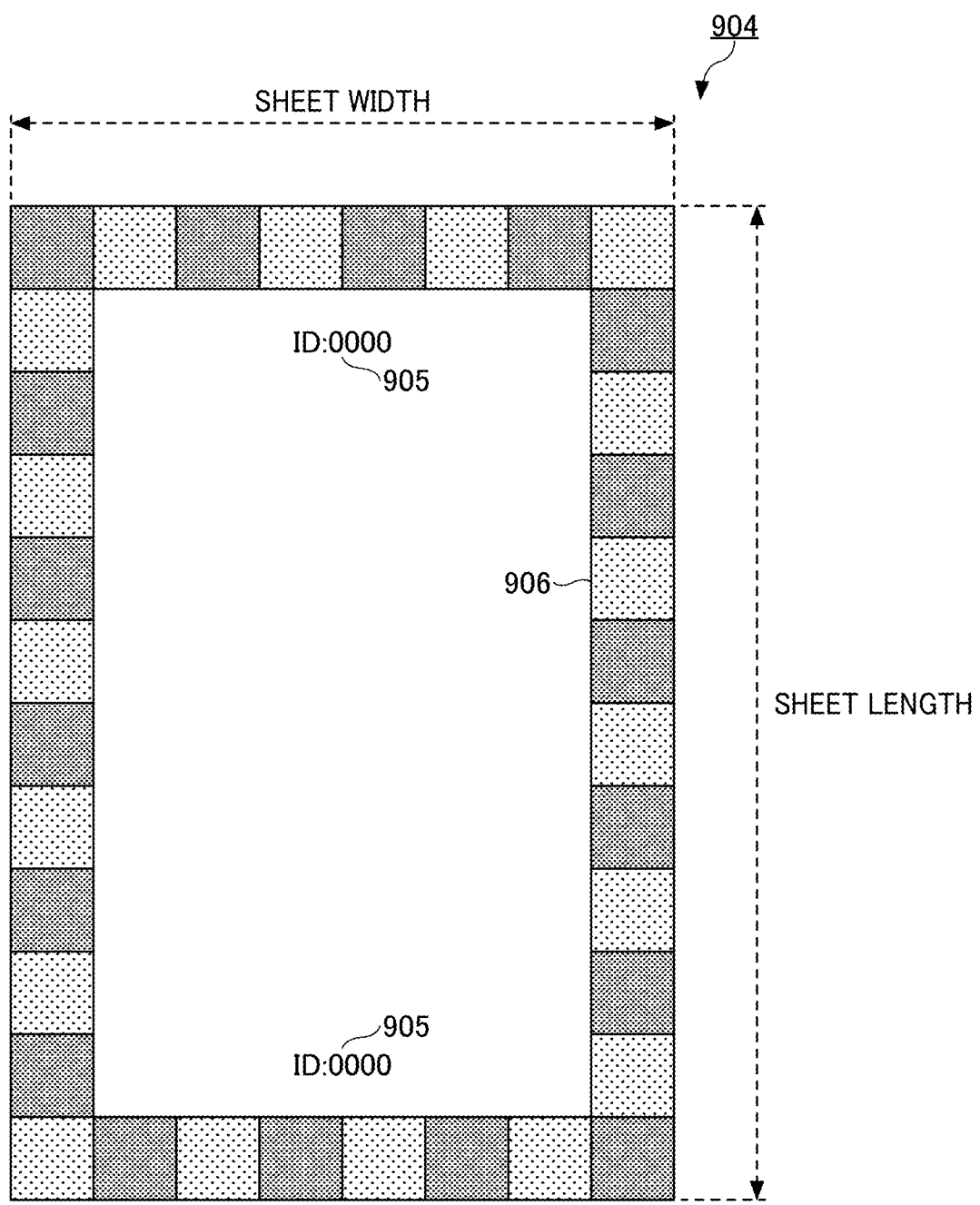

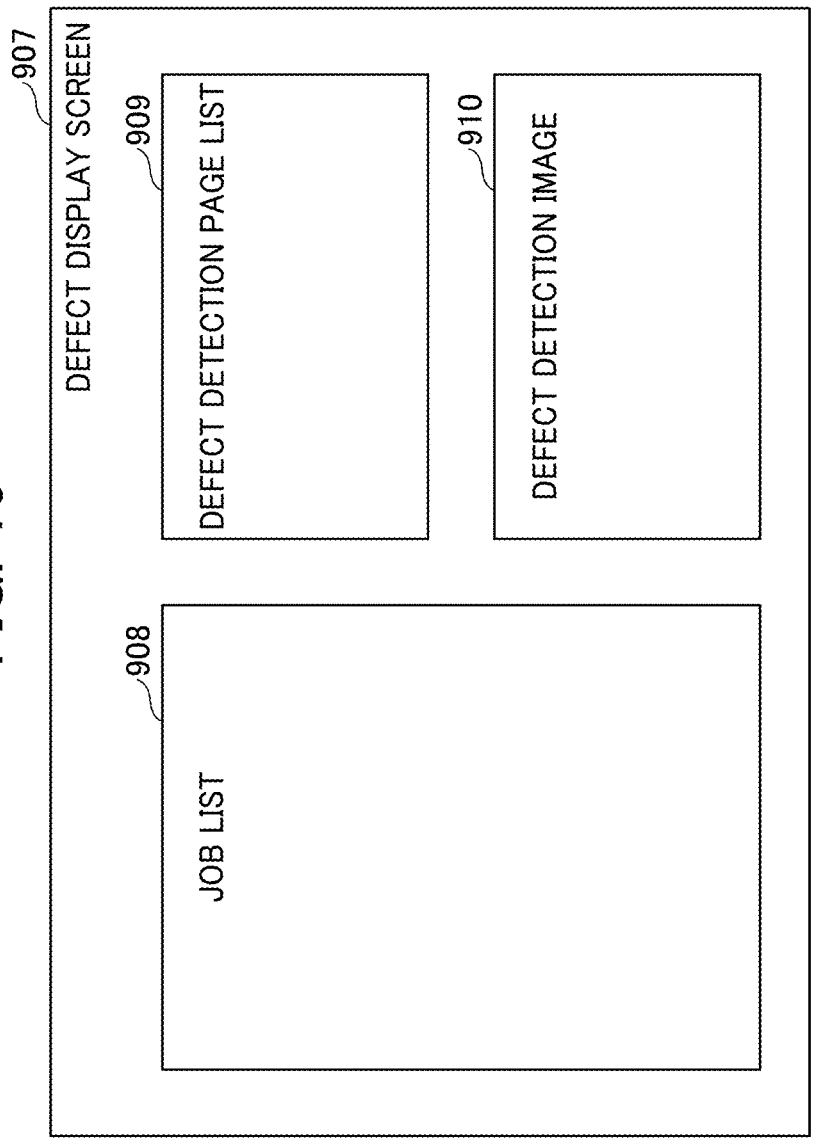

FIG. 16

| INSPECTION PROCESSING START TIME | NUMBER OF COPIES OF JOB | NUMBER OF PAGES OF JOB | NUMBER OF DEFECT DETECTION PAGES OF JOB |
|---|---|---|---|
| 2020/11/13 15:03:05 | 25 | 121 | 5 |
| | | | |
| | | | |

| DEFECT DETECTION TIME | NUMBER OF DEFECTIVE COPIES OCCURRED IN JOB | NUMBER OF DEFECTIVE PAGES OCCURRED IN JOB | NEARBY SLIP SHEET ID | COLOR PATTERN OF NEARBY SLIP SHEET | RELATION OF POSITIONS OF DEFECT DETECTED PAGE AND SLIP SHEET |
|---|---|---|---|---|---|
| 2020/11/13 15:19:01 | 3 | 25 | 0001 | ▨ | 5 PAGES UNDER SLIP SHEET, LOWER FACE |
| 2020/11/13 15:55:43 | 25 | 16 | 0002 | ▨ | 6 PAGES UNDER SLIP SHEET, LOWER FACE |

| DEFECT DETECTION TIME | NUMBER OF DEFECTIVE COPIES OCCURRED IN JOB | NUMBER OF DEFECTIVE PAGES OCCURRED IN JOB | NEARBY SLIP SHEET ID | COLOR PATTERN OF NEARBY SLIP SHEET | RELATION OF POSITIONS OF DEFECT DETECTED PAGE AND SLIP SHEET |
|---|---|---|---|---|---|
| 2020/11/13 15:19:01 | 3 | 25 | | | |
| | | | | | |
| | | | | | |

| DEFECT DETECTION TIME | NUMBER OF DEFECTIVE COPIES OCCURRED IN JOB | NUMBER OF DEFECTIVE PAGES OCCURRED IN JOB | NEARBY SLIP SHEET ID | COLOR PATTERN OF NEARBY SLIP SHEET | RELATION OF POSITIONS OF DEFECT DETECTED PAGE AND SLIP SHEET |
|---|---|---|---|---|---|
| 2020/11/13 15:19:01 | 3 | 25 | 0001 | ▨ ▨ | 5 PAGES UNDER SLIP SHEET, LOWER FACE |
| | | | | | |
| | | | | | |

| DEFECT DETECTION TIME | NUMBER OF DEFECTIVE COPIES OCCURRED IN JOB | NUMBER OF DEFECTIVE PAGES OCCURRED IN JOB | NEARBY SLIP SHEET ID | COLOR PATTERN OF NEARBY SLIP SHEET | RELATION OF POSITIONS OF DEFECT DETECTED PAGE AND SLIP SHEET |
|---|---|---|---|---|---|
| 2020/11/13 15:19:01 | 3 | 25 | 0001 | RED AND YELLOW | 5 PAGES UNDER SLIP SHEET, LOWER FACE |
| 2020/11/13 15:55:43 | 25 | 16 | 0002 | YELLOW AND GREEN | 6 PAGES UNDER SLIP SHEET, LOWER FACE |

FIG. 24

| DEFECT DETECTION TIME | NUMBER OF DEFECTIVE COPIES OCCURRED IN JOB | NUMBER OF DEFECTIVE PAGES OCCURRED IN JOB | NEARBY SLIP SHEET ID | COLOR PATTERN OF NEARBY SLIP SHEET | RELATION OF POSITIONS OF DEFECT DETECTED PAGE AND SLIP SHEET |
|---|---|---|---|---|---|
| 2020/11/13 15:19:01 | 3 | 25 | 0001 |  | 5 PAGES UNDER SLIP SHEET, LOWER FACE |
| 2020/11/13 15:19:51 | 3 | 78 | 0001 |  | 22 PAGES OVER SLIP SHEET, UPPER FACE |
| 2020/11/13 15:55:43 | 25 | 16 | 0002 |  | 6 PAGES UNDER SLIP SHEET, LOWER FACE |

FIG. 25

| DEFECT DETECTION TIME | NUMBER OF DEFECTIVE COPIES OCCURRED IN JOB | NUMBER OF DEFECTIVE PAGES OCCURRED IN JOB | NEARBY SLIP SHEET ID | COLOR PATTERN OF NEARBY SLIP SHEET | RELATION OF POSITIONS OF DEFECT DETECTED PAGE AND SLIP SHEET |
|---|---|---|---|---|---|
| 2020/11/13 15:19:01 | 3 | 25 | 0001 | RED AND YELLOW | 5 PAGES UNDER SLIP SHEET, LOWER FACE |
| 2020/11/13 15:19:51 | 3 | 78 | 0001 | RED AND YELLOW | 22 PAGES OVER SLIP SHEET, UPPER FACE |
| 2020/11/13 15:55:43 | 25 | 16 | 0002 | YELLOW AND GREEN | 6 PAGES UNDER SLIP SHEET, LOWER FACE |

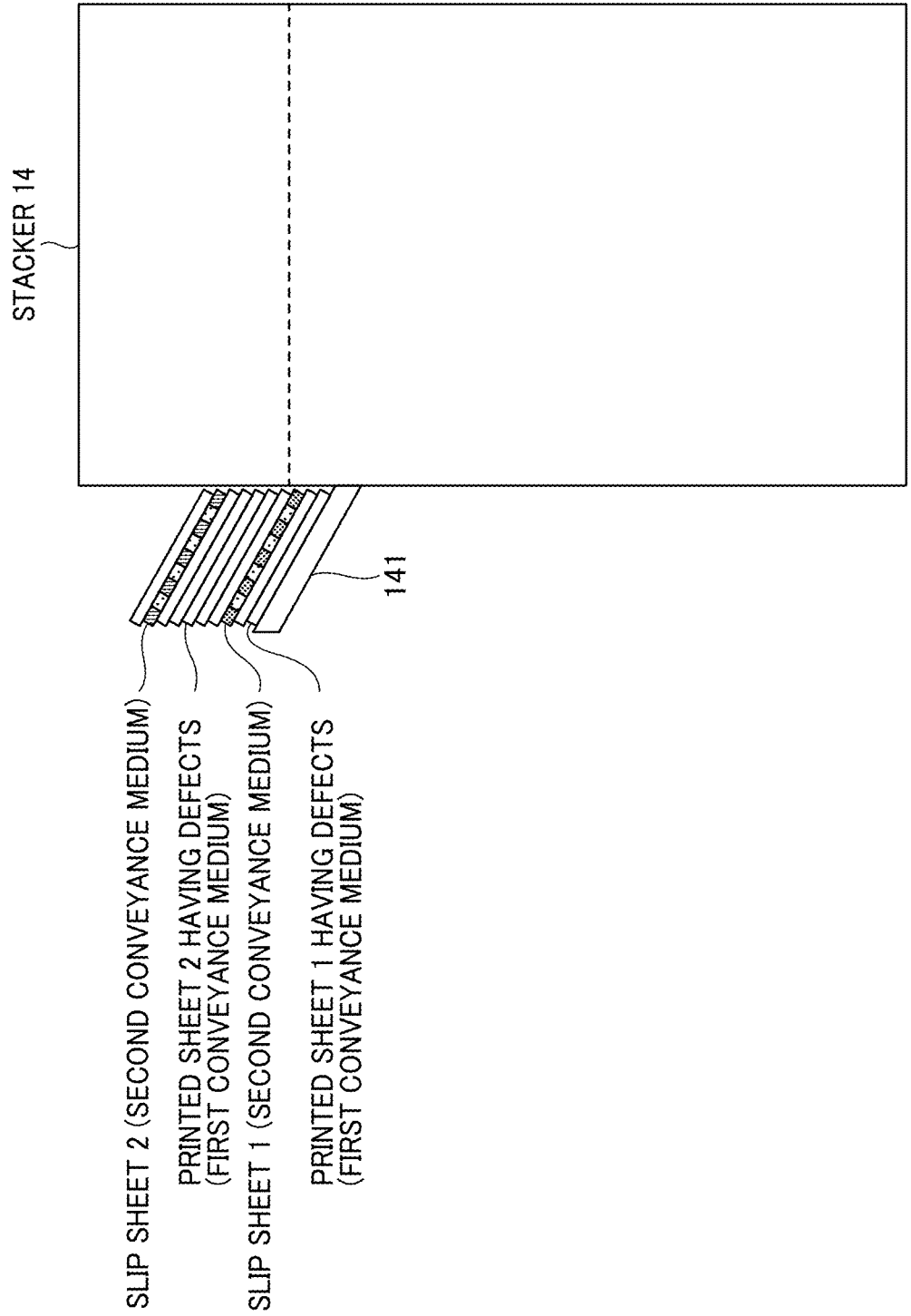

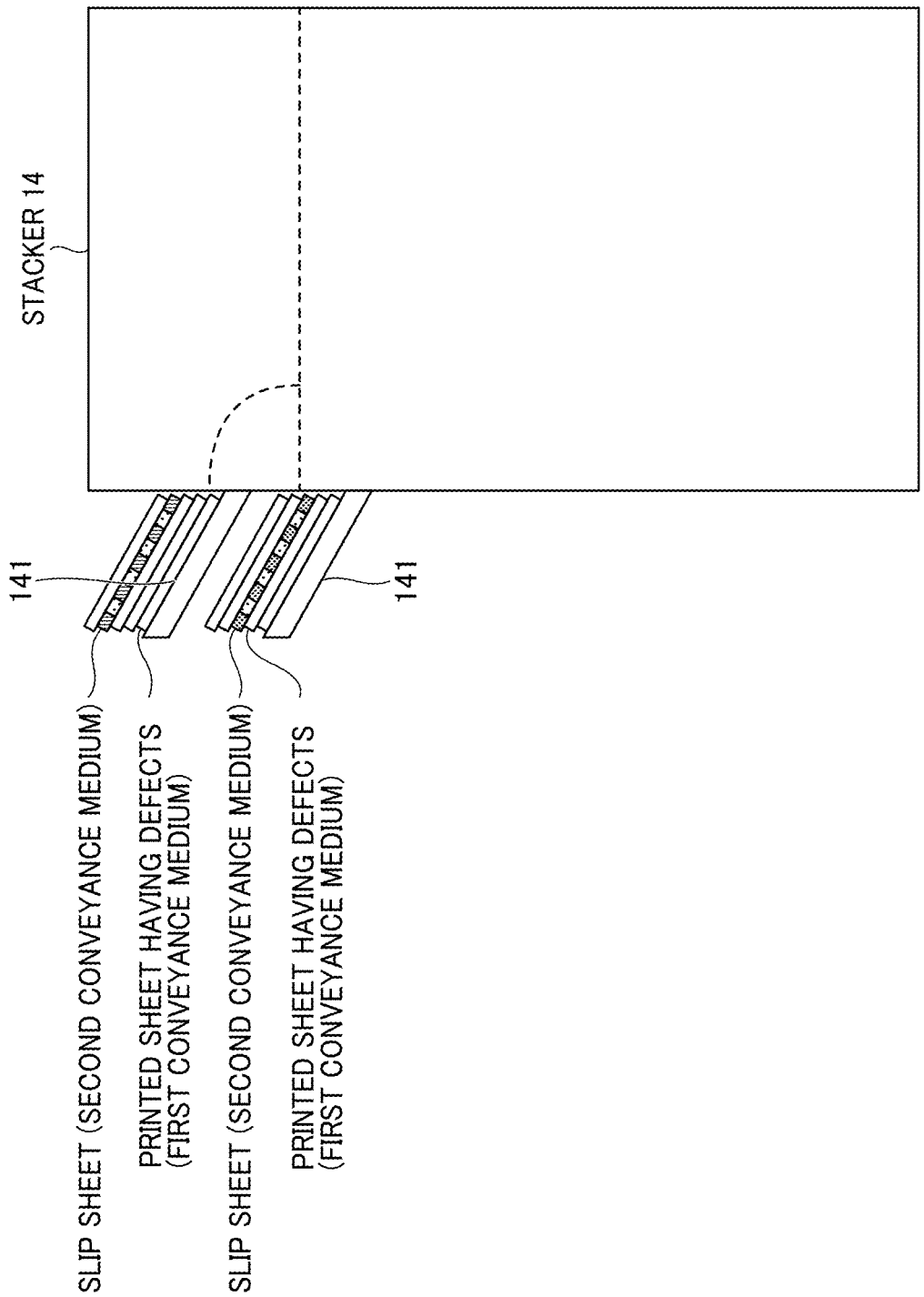

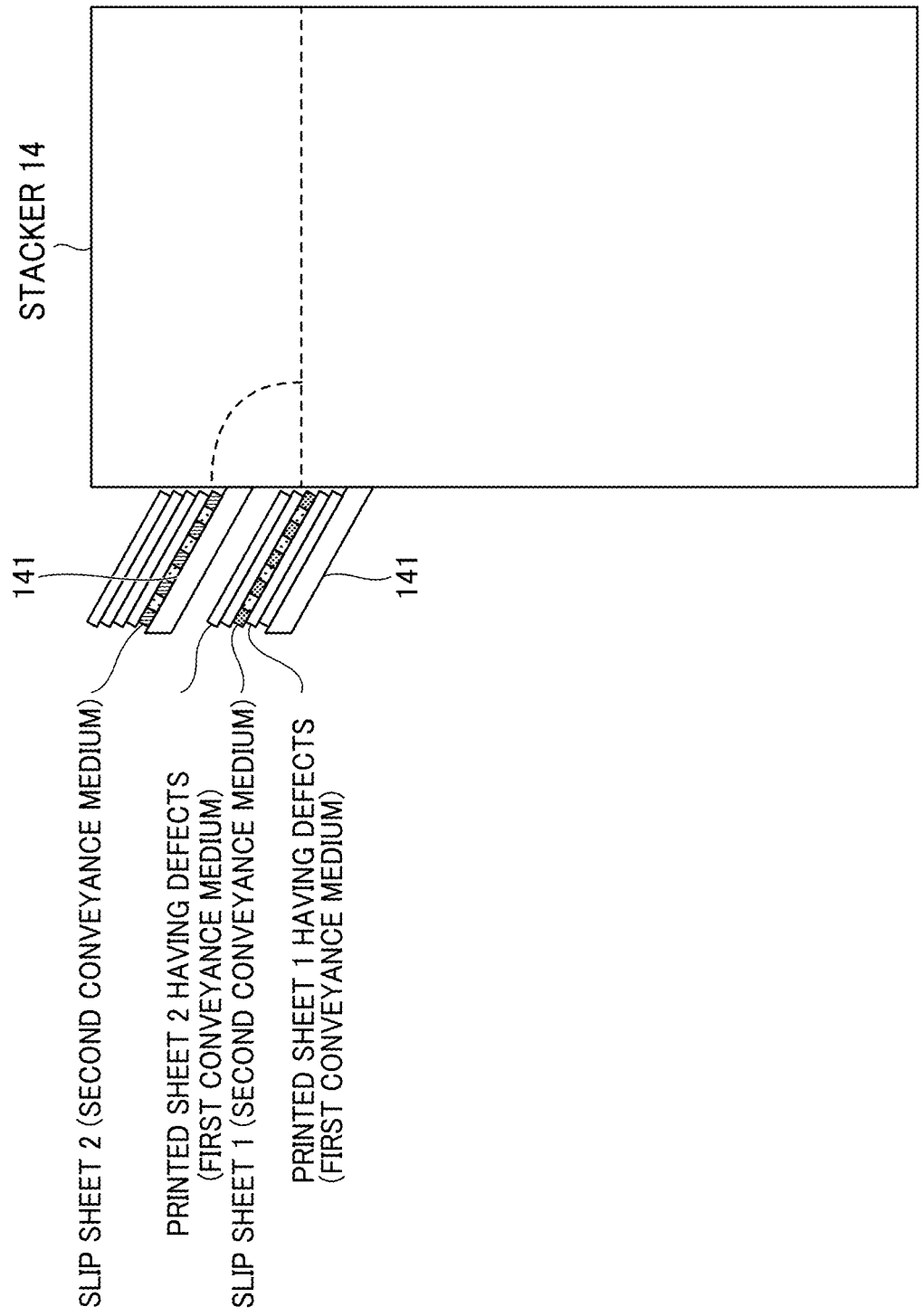

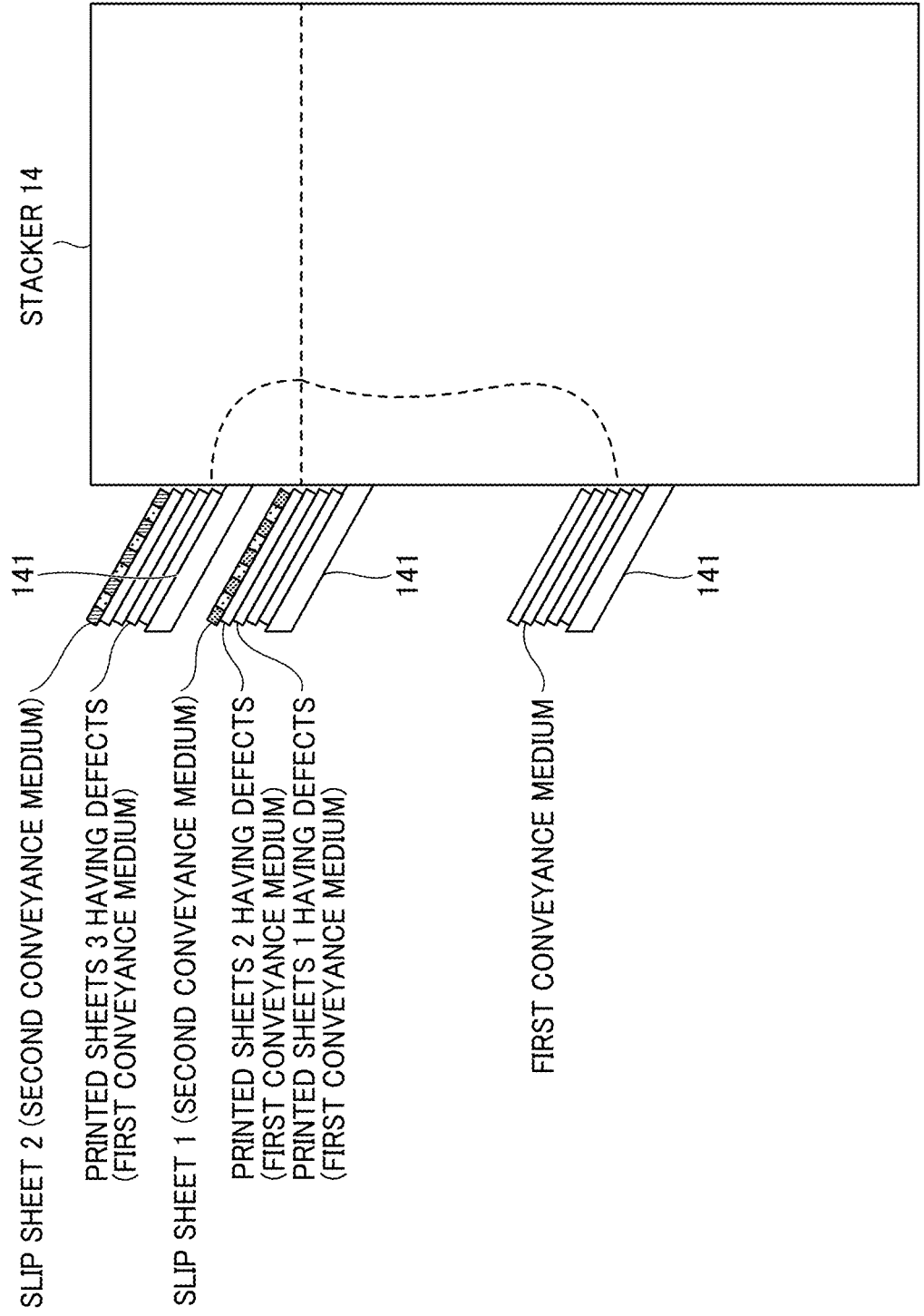

FIG. 30

| DEFECT DETECTION TIME | NUMBER OF DEFECTIVE COPIES OCCURRED IN JOB | NUMBER OF DEFECTIVE PAGES OCCURRED IN JOB | NEARBY SLIP SHEET ID | COLOR PATTERN OF NEARBY SLIP SHEET | RELATION OF POSITIONS OF DEFECT DETECTED PAGE AND SLIP SHEET | OUTPUT TRAY OF DEFECTED SHEET | OUTPUT TRAY OF SLIP SHEET |
|---|---|---|---|---|---|---|---|
| 2020/11/13 15:19:01 | 3 | 25 | 0001 | | 5 PAGES UNDER SLIP SHEET, LOWER FACE | TRAY A | TRAY A |
| 2020/11/13 15:55:43 | 25 | 16 | 0002 | | 6 PAGES UNDER SLIP SHEET, LOWER FACE | TRAY B | TRAY A |

IMAGE FORMING SYSTEM, INSPECTION DEVICE, AND INSPECTION METHOD

CROSS-REFERENCE TO RELATED APPLICATIONS

This patent application is based on and claims priority pursuant to 35 U.S.C. § 119(a) to Japanese Patent Application No. 2021-046488, filed on Mar. 19, 2021, in the Japan Patent Office, the entire disclosure of which is hereby incorporated by reference herein.

BACKGROUND

Technical Field

Embodiments of the present disclosure relate to an image forming system, an inspection device, and an inspection method.

Related Art

Various technologies have been developed that detect a defect in an image formed by the image forming apparatus, based on a result of reading the image. For example, a technology is known that inserts a slip sheet (insertion sheet) between a bundle of printed materials so that a printed material in which a defect is detected is easily found from the bundle of printed materials stacked on a sheet ejection tray.

SUMMARY

Embodiments of the present disclosure described herein provide a novel image processing system including an image forming device, a sensor, processing circuitry, an ejection device. The image forming device forms an image based on print information, on a first conveyance medium. The sensor acquires information about the image formed on the first conveyance medium by the image forming device. The processing circuitry causes a second conveyance medium to be ejected in a case where the image formed on the first conveyance medium is a defective image, based on the information acquired by the sensor. The ejection device stacks the first conveyance medium and the second conveyance medium. The processing circuitry controls display of identification information that distinguishes and associates each one of a plurality of first conveyance media having defective images stacked on the ejection device, with a corresponding one of a plurality of second conveyance media stacked on the ejection device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a diagram illustrating items of job information, according to embodiments of the present disclosure;

FIG. 9 is a diagram illustrating pattern information, according to embodiments of the present disclosure;

FIG. 10 is a first diagram illustrating slip sheet print information, according to embodiments of the present disclosure;

FIG. 14 is a diagram illustrating the slip sheet, according to embodiments of the present disclosure;

FIG. 15 is a diagram illustrating a defect display screen, according to embodiments of the present disclosure;

FIG. 16 is a diagram illustrating a job list, according to embodiments of the present disclosure;

FIG. 17 is a first diagram illustrating a defect detection page list according to a first embodiment of the present disclosure;

FIG. 19 is a second diagram illustrating the defect detection page list according to the first embodiment;

FIG. 20 is a third diagram illustrating the defect detection page list according to the first embodiment;

FIG. 22 is a fourth diagram illustrating the defect detection page list according to the first embodiment;

FIG. 24 is a first diagram illustrating the defect detection page list according to a second embodiment of the present disclosure;

FIG. 25 is a second diagram illustrating the defect detection page list according to the second embodiment;

FIG. 26 is a first diagram illustrating a method of ejecting sheets to a sheet ejection tray according to the second embodiment;

FIG. 27 is a second diagram illustrating a method of ejecting sheets to the sheet ejection tray according to the second embodiment;

FIG. 28 is a third diagram illustrating a method of ejecting sheets to the sheet ejection tray according to the second embodiment;

FIG. 29 is a fourth diagram illustrating a method of ejecting sheets to the sheet ejection tray according to the second embodiment; and FIG. 30 is a diagram illustrating the defect detection page list in the case of ejecting sheets to a plurality of sheet ejection trays according to the second embodiment.

Figure 1:
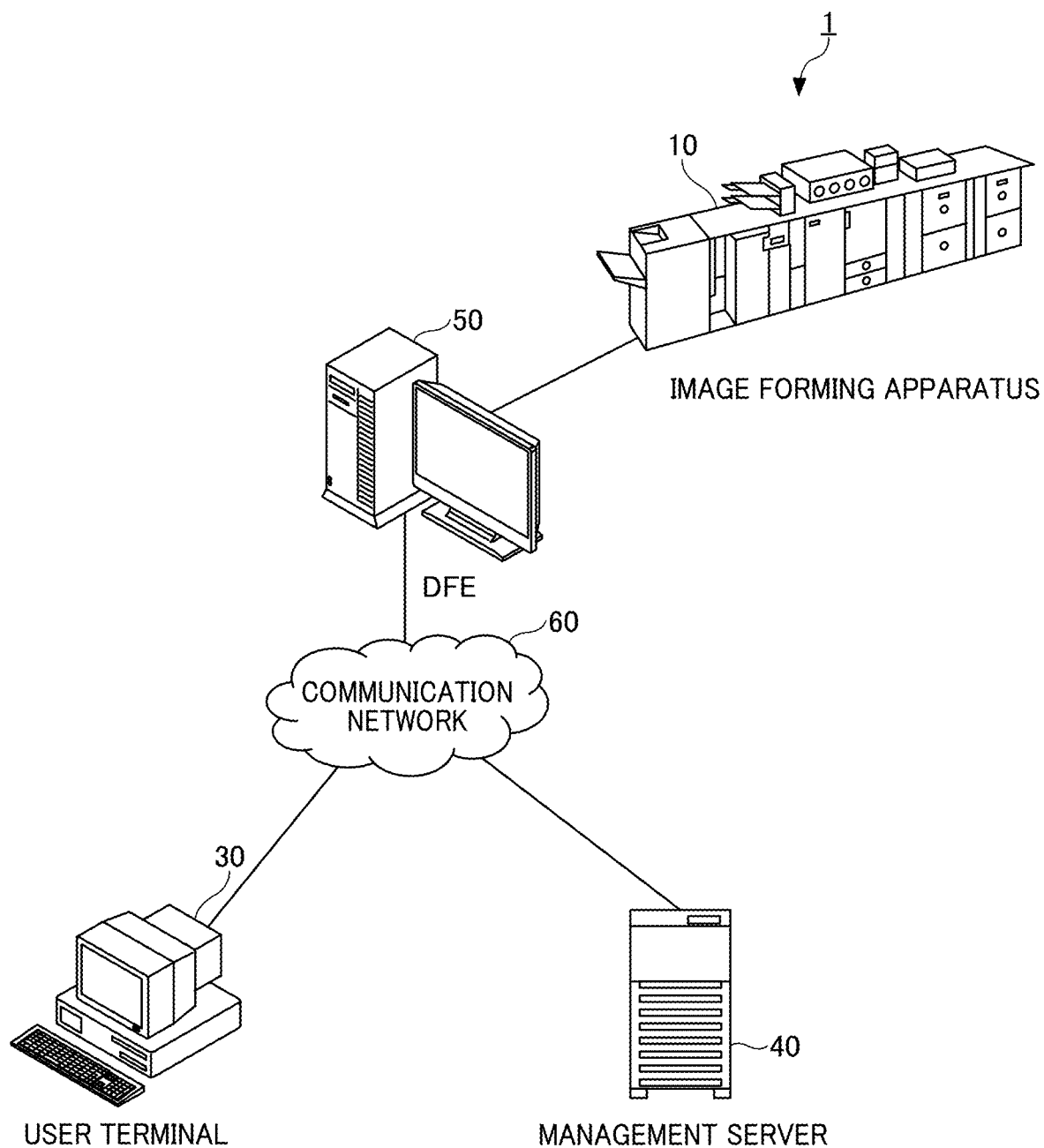
FIG. 1 is a diagram illustrating an overall configuration of an image forming system, according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First Embodiment

Descriptions are given of an image forming system according to a first embodiment of the present disclosure, with reference to the drawings.

FIG. 1 is a diagram illustrating an overall configuration of an image forming system, according to embodiments of the present disclosure.

An image forming system 1 includes an image forming apparatus 10, a user terminal 30, a management server 40, and a digital front end (DFE) 50.

The image forming apparatus 10 is an apparatus to form an image, and is, for example, a color production printer, a laser printer, or an inkjet printer. The image forming apparatus 10 receives image data from the DFE 50 and prints the image on a sheet based on the received image data. Note that the sheet is an example of a recording medium on which an image is formed.

The user terminal 30 is a terminal that receives an operation from a user and instructs to print the image. Specifically, the user terminal 30 transmits print job data including image data to the DFE 50 or the management server 40. The user terminal 30 transmits information indicating a threshold in color stabilization processing to the DFE 50 in response to an operation of the user. In addition, the user terminal 30 receives display control by the DFE 50 and displays a screen indicating an execution status of the color stabilization processing.

The management server 40 adds the print job data as a queue to a memory that stores the print job data waiting for printing in response to the receipt of the print job data from the user terminal 30. The management server 40 extracts print job data from the queue in the order in which the print job data is added to the queue or in accordance with a priority set appropriately. Then, the management server 40 transmits the print job data to the DFE 50.

The DFE 50 is an apparatus that controls the image forming apparatus 10, for example, a DFE. The DFE 50 is communicably connected to the image forming apparatus 10, the user terminal 30, and the management server 40.

When the DFE 50 receives print job data with a signal that instructs to print the image from the user terminal 30 or the management server 40, the DFE 50 converts the print job data into image data in a format that is processed by the image forming apparatus 10, using a raster image processor (RIP) engine included in the image forming apparatus 10. Then, the DFE 50 transmits the converted image data to the image forming apparatus 10.

Figure 2:
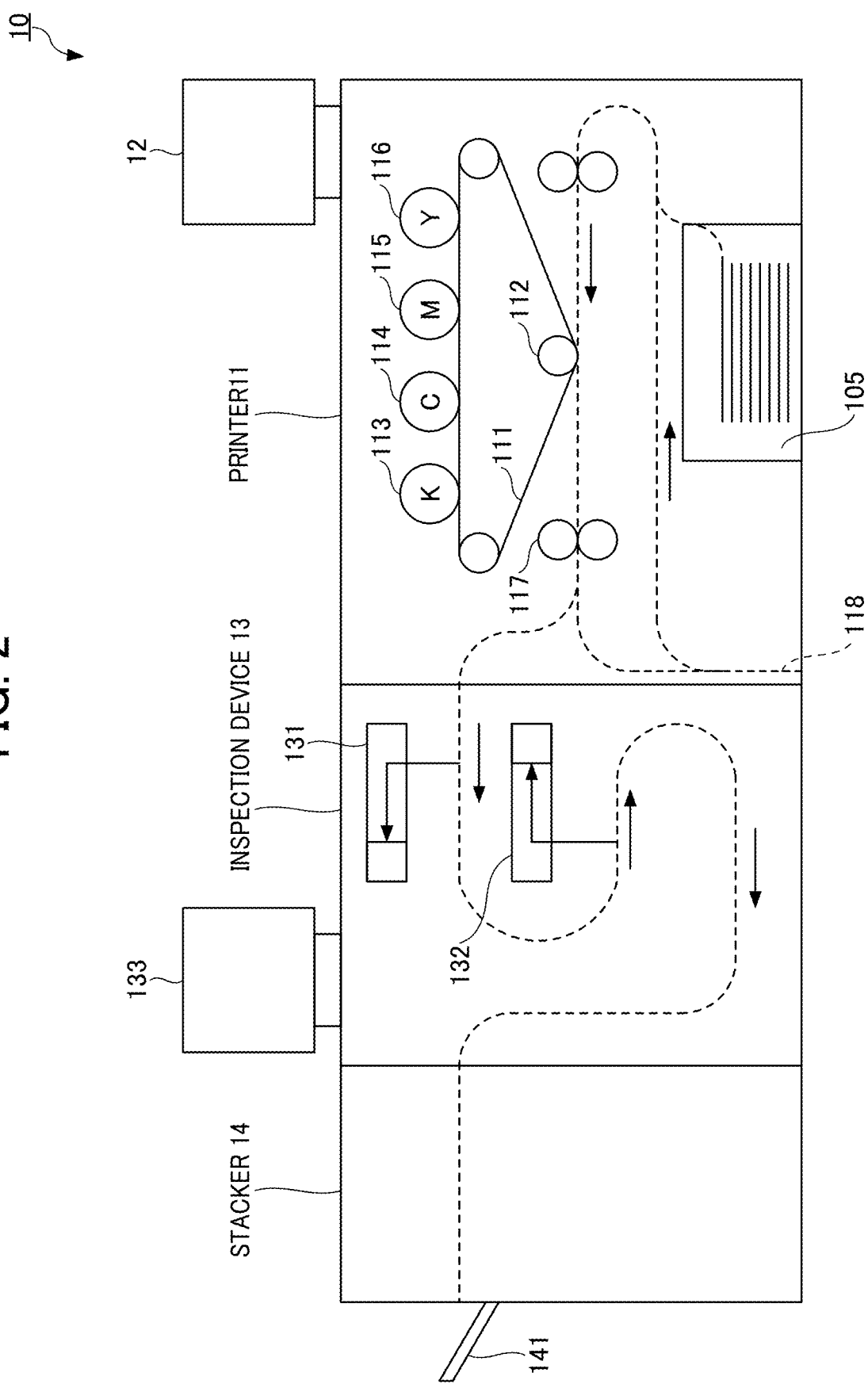
FIG. 2 is a diagram illustrating a hardware configuration of an image forming apparatus of the image forming system of FIG. 1.

FIG. 2 is a diagram illustrating a hardware configuration of an image forming apparatus of the image forming system of FIG. 1.

The image forming apparatus 10 includes a printer 11, an inspection device 13, and a stacker 14.

The printer 11 receives the print job data including a print image (rasterized image) from an external apparatus such as the DFE 50. Then, the printer 11 executes printing in response to an execution instruction based on the received print job data or an execution instruction based on the print job data stored in the printer 11 by a user's operation on an operation panel 12.

The printer 11 has a configuration in which photoconductor drums 116, 115, 114, and 113 are disposed along an intermediate transfer belt 111. The photoconductor drums 116, 115, 114, and 113 form yellow (Y), magenta (M), cyan (C), and black (K) toner images, respectively. The intermediate transfer belt 111 is a moving unit of an endless loop. Images of the respective colors are developed with toner on the respective surfaces of the photoconductor drums 116, 115, 114, and 113 and are transferred and superimposed one after another onto the surface of the intermediate transfer belt 111 to form a full-color image.

The full-color image borne on the intermediate transfer belt 111 is transferred onto the sheet by a transfer roller 112. The sheet is fed from a sheet feeding tray 105 and conveyed by a transfer roller 112. Then, the sheet is further conveyed, and the toner is fixed to the sheet by a fixing roller 117. Note that, when outputting a slip sheet without printing, another sheet feeding tray for the slip sheet may be provided separate from the sheet feeding tray 105. Further, a slip sheet feeding device may be provided in the inspection device 13 or between the printer 11 and the inspection device 13.

In the case of duplex printing, after the image is formed on the front side, the sheet is conveyed to a sheet reverse passage 118 in the sheet conveyance passage, then is reversed, and is conveyed again to the position of the transfer roller 112.

The inspection device 13 is a device that inspects printed sheets by the printer 11. Each of the printed sheets to be inspected is referred to as a first conveyance medium in the present disclosure. The inspection device 13 includes a first inline sensor 131, a second inline sensor 132, and an operation panel 133. The inspection device 13 may not include the operation panel 133. In this case, the inspection device 13 may be configured to receive an operation through the operation panel 12 of the printer 11 or a computer connected via a communication network.

The first inline sensor 131 and the second inline sensor 132 read the images fixed on both sides of the sheet by the fixing roller 117 and obtain read image data indicating the read images. The number of inline sensors is not limited to two and may be one or three or more as long as both sides of the sheet are read. An inline sensor includes a light source and a line image sensor. The light source irradiate light onto a sheet passing over a reading position. The line image sensor includes a plurality of imaging elements aligned one dimensionally in the width direction of a sheet. The plurality of imaging elements optically converts reflected light reflected on the sheet for each pixel to read the reflected light. The inline sensor reads an image printed on the sheet as a two-dimensional image by repeatedly performing an operation of reading the image for one line in the width direction of the sheet, in accordance with the sheet passing operation over the reading position. Further, the line image sensor captures read images of three colors of red, green, and blue (RGB). The inline sensor is an example of an information acquisition device that acquires information about the image on the sheet. The information acquisition device may acquire information other than the read image data as long as the information is information for detecting a defect such as image data or bibliographic information of the image data.

The stacker 14 includes a sheet ejection tray 141 and stacks printed sheets ejected from the printer 11 via the inspection device 13 on the sheet ejection tray 141. The stacker 14 and the sheet ejection tray 141 are configured to receive and stack the printed sheets and the slip sheets. The stacker 14 and the sheet ejection tray 141 are an example of an ejection device in the present disclosure. The stacker 14 may have a plurality of sheet ejection trays 141.

The present embodiment is given providing that, for example, that the rasterized image is in the CMYK format (format in a subtractive color mode including cyan, magenta, yellow, and black) with 8 bits colors and 600 dpi resolution, and the read image is in the RGB format with 8 bits colors and 200 dpi resolution. However, embodiments of the present disclosure are not limited to the above-described data formats in image formation.

Figure 3:
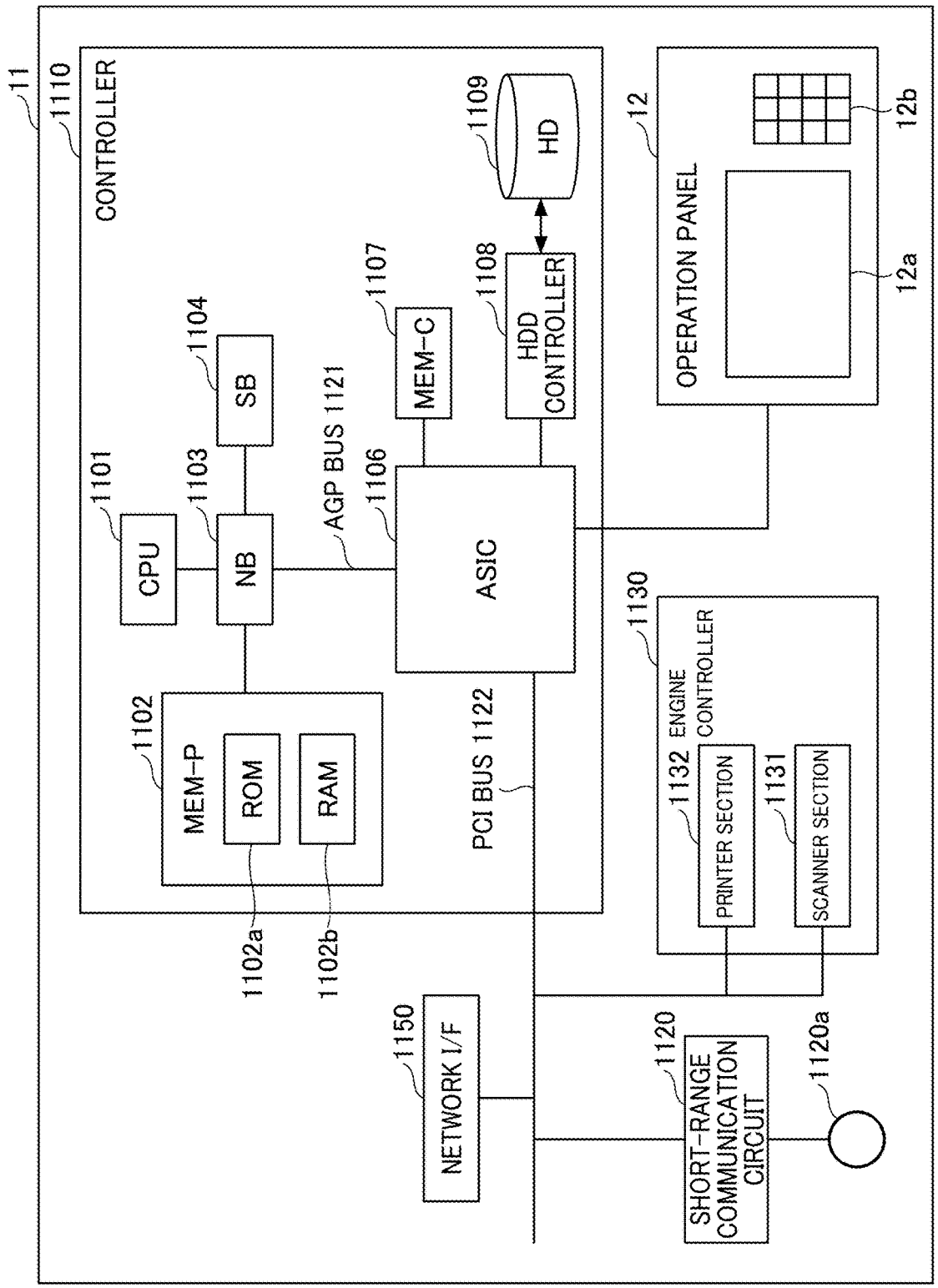
FIG. 3 is a diagram illustrating a hardware configuration of a printer of the image forming system of FIG. 1.

FIG. 3 is a diagram illustrating a hardware configuration of a printer of the image forming system of FIG. 1.

The printer 11 includes a controller 1110, a short-range communication circuit 1120, an engine controller 1130, the operation panel 12, and a network I/F 1150.

The controller 1110 includes a central processing unit (CPU) 1101 that is a main part of a computer, a system memory (MEM-P) 1102, a north bridge (NB) 1103, a south bridge (SB) 1104, an application specific integrated circuit (ASIC) 1106, a local memory (MEM-C) 1107 that is a memory, a hard disk drive (HDD) controller 1108, and a hard disk (HD) 1109 that is a memory.

The NB 1103 and the ASIC 1106 are connected by an accelerated graphics port (AGP) bus 1121.

The CPU 1101 is a control device that performs overall control of the printer 11. The NB 1103 is a bridge configured to connect the CPU 1101, the MEM-P 1102, the SB 1104, and the AGP bus 1121. The NB 1103 includes a memory controller that controls reading from and writing to the MEM-P 1102, a peripheral component interconnect (PCI) master, and an AGP target.

The MEM-P 1102 includes a read only memory (ROM) 1102a and a random access memory (RAM) 1102b. The ROM 1102a is a memory to store programs and data for implementing various functions of the controller 1110. The RAM 1102b is a memory configured to deploy programs, data or to render print data for memory printing. The program stored in the RAM 1102b may be provided as a file in an installable format or an executable format that the program is recorded in a computer-readable storage medium such as a compact disc-read only memory (CD-ROM), a compact disc-recordable (CD-R), or a digital versatile disc (DVD).

The SB 1104 is a bridge configured to connect the NB 1103 to PCI devices and peripheral devices. The ASIC 1106 is an integrated circuit (IC) for image processing having a hardware element for image processing and has a role of a bridge that connects the AGP bus 1121, the PCI bus 1122, the HDD controller 1108, and the MEM-C 1107 to each other.

The ASIC 1106 includes a PCI target, an AGP master, an arbiter (ARB) serving as a core of the ASIC 1106, a memory controller that controls the MEM-C 1107, a plurality of direct memory access controllers (DMAC) that rotates image data by hardware logic, and a PCI unit that transfers data between a scanner section 1131 and a printer section 1132 via the PCI bus 1122. A universal serial bus (USB) interface or an Institute of Electrical and Electronics Engineers 1394 (IEEE 1394) interface may be connected to the ASIC 1106.

The MEM-C 1107 is a local memory used as a copy image buffer and a code buffer. The HD 1109 is a memory that stores image data, font data used in printing, and forms. The HD 1109 controls reading or writing of data from or to the HD 1109 under the control of the CPU 1101.

The AGP bus 1121 is a bus interface for a graphics accelerator card that has been proposed to speed up graphics processing. The AGP bus 1121 is a bus that directly access the MEM-P 1102 at high throughput to speed up a graphics accelerator card.

The short-range communication circuit 1120 includes a short-range communication antenna 1120a. The short-range communication circuit 1120 is a communication circuit that communicates in compliance with the near field radio communication (NFC) or the Bluetooth®.

The engine controller 1130 includes the scanner section 1131 and the printer section 1132. The operation panel 12 includes a panel display 12a and a hard keys 12b. The panel display 12a is, e.g., a touch panel that displays current settings or a selection screen that receives the user input. The hard keys 12b includes, e.g., a numeric keypad and a start key. The numeric keypad receives setting values of image forming parameters such as an image density parameter. The start key receives an instruction to start copying.

The controller 1110 controls the overall printer 11 and controls, for example, drawing, communication, and input from the operation panel 12. The scanner section 1131 reads the image formed on a conveyance medium such as a sheet and generates image data. The printer section 1132 includes a transfer device that transfers the image using a color material such as a toner image onto a conveyance medium such as the sheet, a fixing device that fixes the image, a heating device, a drying device, and performs image formation on the sheet. Further, the scanner section 1131 or the printer section 1132 executes image processing such as error diffusion and gamma conversion.

The network I/F 1150 is an interface that performs communication of data through the communication network. The short-range communication circuit 1120 and the network I/F 1150 are electrically connected to the ASIC 1106 via the PCI bus 1122.

Figure 4:
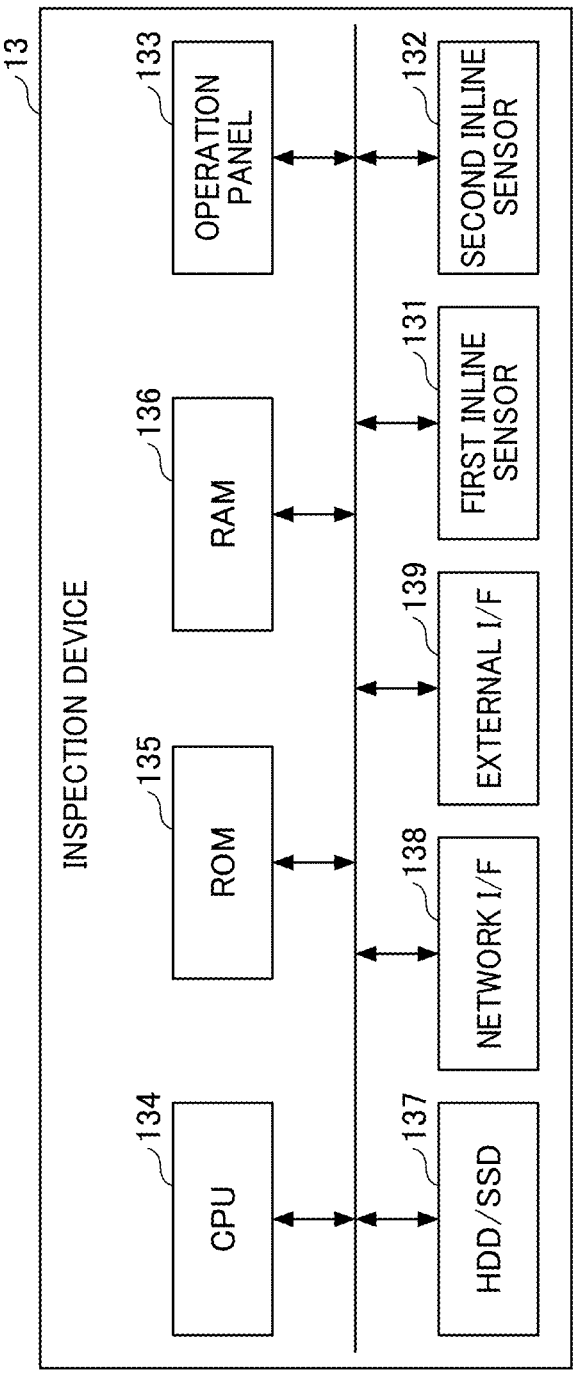
FIG. 4 is a diagram illustrating a hardware configuration of an inspection device of the image forming apparatus of FIG. 2.

FIG. 4 is a diagram illustrating a hardware configuration of an inspection device of the image forming apparatus of FIG. 2.

The inspection device 13 includes the first inline sensor 131, the second inline sensor 132, the operation panel 133, and a CPU 134, a ROM 135, a RAM 136, an HDD/solid state drive (SSD) 137, a network I/F 138, and an external I/F 139. The CPU 134, the ROM 135, the RAM 136, and the HDD/SSD are configured by a computer.

The CPU 134 reads programs stored in the ROM 135 or the HDD/SSD 137 and stores the programs in the RAM 136. Then, the CPU 134 executes various processes in accordance with the program stored in the RAM 136. The processes are described below.

The ROM 135 is a non-volatility auxiliary memory device. The ROM 135 stores programs such as a basic input/output system (BIOS) that is programed basic operations of the inspection device 13.

The RAM 136 is a volatile main memory device. The RAM 136 is used as a working area of the CPU 134.

The HDD/SSD 137 is a large capacity non-volatility auxiliary memory device. The HDD/SSD 137 stores received image data, programs for various processes, and setting information. The processes are described below.

The network I/F 138 is, for example, a local area network (LAN) card, and is a relay unit for communicating with other devices via a communication network.

The external I/F 139 is a relay unit for communicating with the devices connected as external devices, such as the DFE 50, the printer 11, and the stacker 14.

Note that the DFE 50 has the substantially same hardware configuration as the hardware configuration of the inspection device 13, except that the DFE 50 has the first inline sensor 131, the second inline sensor 132, and the operation panel 133.

Figure 5:
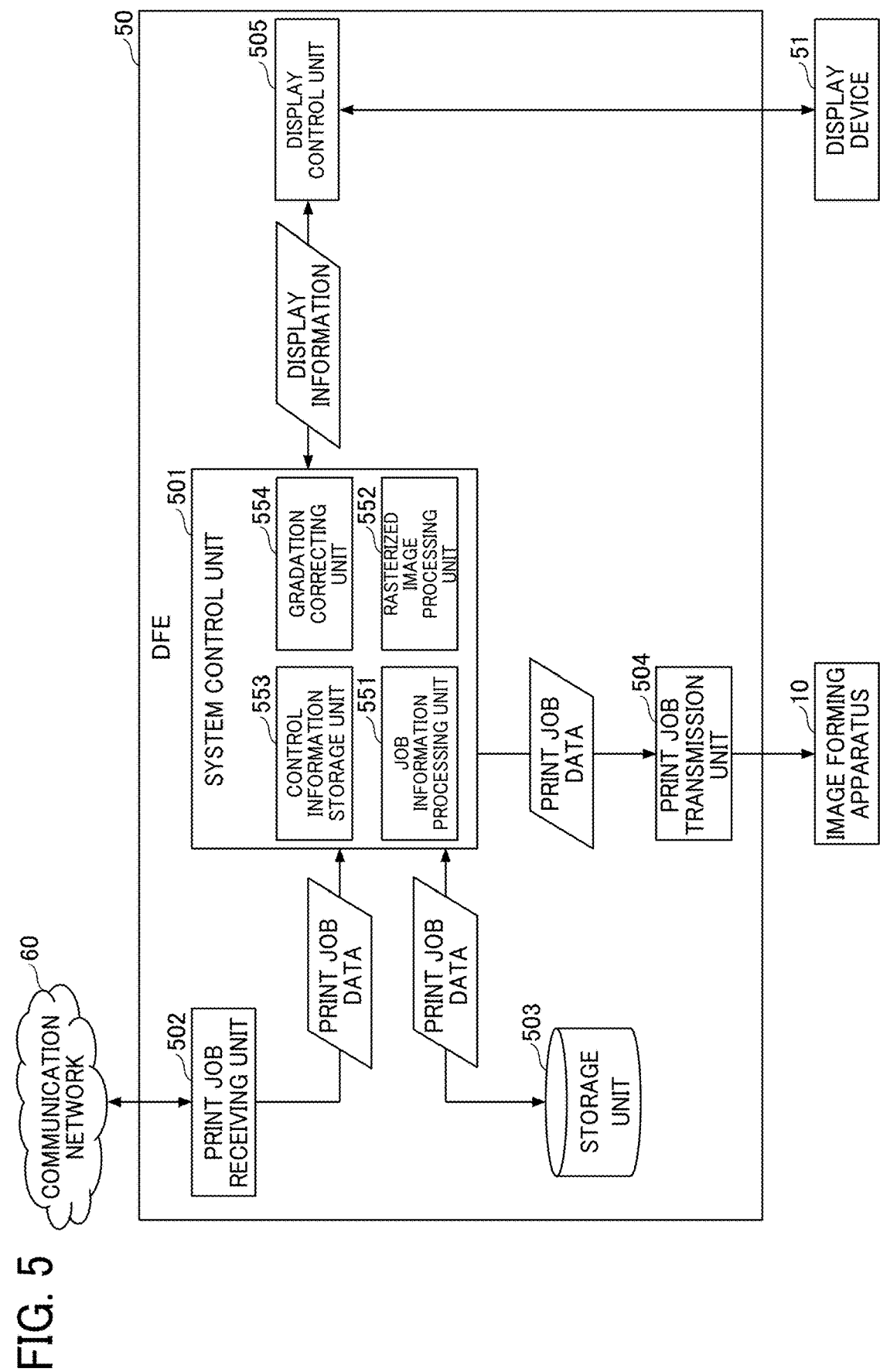
FIG. 5 is a diagram illustrating functions of a digital front end (DFE) of the image forming system of FIG. 1.

FIG. 5 is a diagram illustrating functions of the DFE of the image forming system of FIG. 1.

The DFE 50 includes a system control unit 501, a print job receiving unit 502, a storage unit 503, a print job transmission unit 504, and a display control unit 505. Each of the units of the DFE 50 is achieved by a CPU included in the DFE 50 executing processing defined in programs stored in a ROM included in the DFE 50.

The system control unit 501 includes a job information processing unit 551, a rasterized image processing unit 552, a control information storage unit 553, and a gradation correcting unit 554.

The job information processing unit 551 processes information about a job included in the print job data.

The rasterized image processing unit 552 performs predetermined color conversion processing on the CMYK values or the RGB values of the input image data using a RIP engine and converts the CMYK values or the RGB values into image data in a CMYK format suitable for the image forming apparatus 10.

The control information storage unit 553 stores control information controlled by the system control unit 501.

The gradation correcting unit 554 corrects gradation of the image data converted by the rasterized image processing unit 552.

The print job receiving unit 502 receives the print job data from the user terminal 30 or the management server 40 via the communication network 60.

The storage unit 503 stores the received print job data.

The print job transmission unit 504 transmits the print job data to the image forming apparatus 10. The print job data is generated through processing by the system control unit 501. The print job data transmitted to the image forming apparatus 10 includes rasterized image data and job information indicating attributes of the print job.

The display control unit 505 controls to display information generated by the system control unit 501 on the display device 51.

Figure 6:
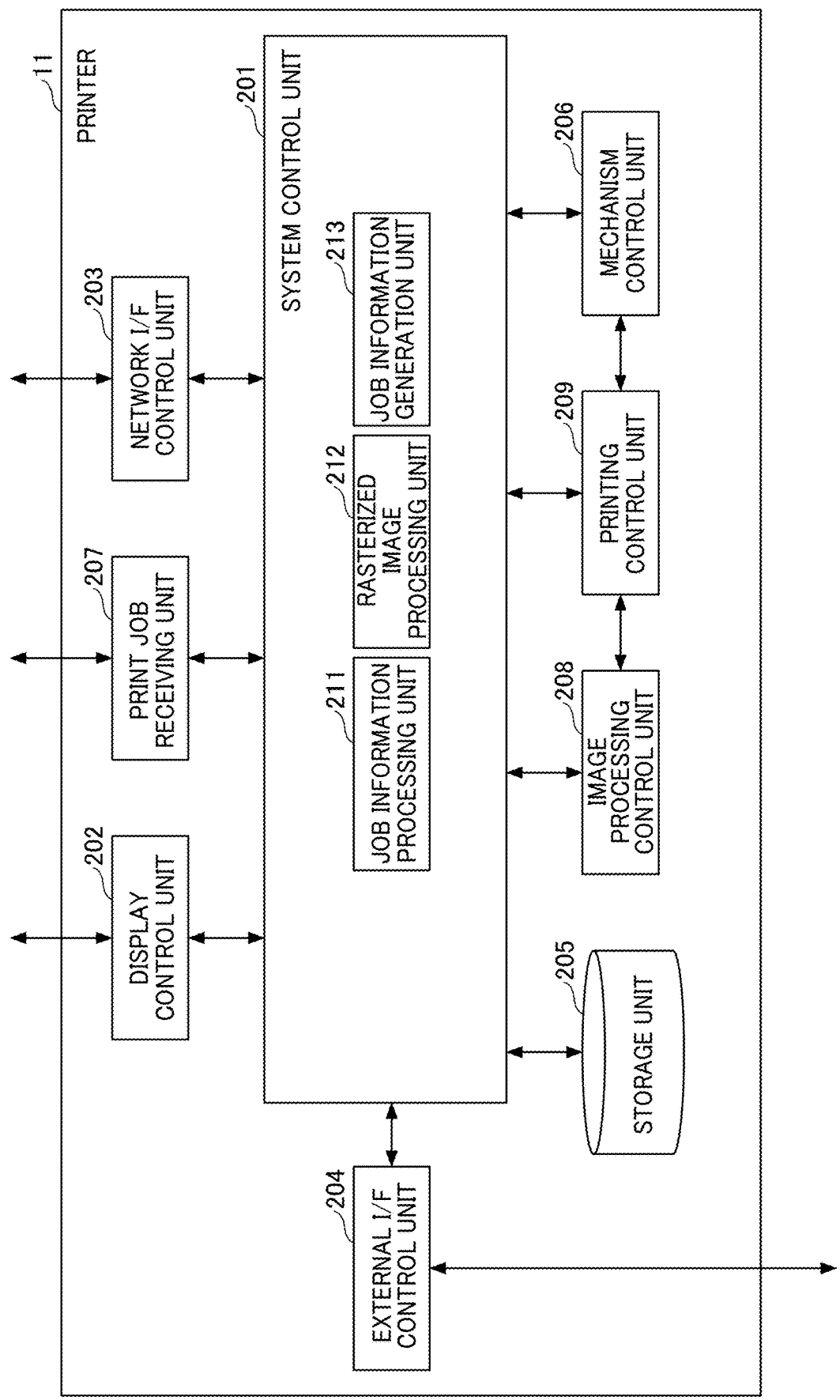
FIG. 6 is a diagram illustrating functions of the printer of the image forming apparatus of FIG. 2.

FIG. 6 is a diagram illustrating functions of the printer of the image forming apparatus of FIG. 2.

The printer 11 includes a system control unit 201, a display control unit 202, a network I/F control unit 203, an external I/F control unit 204, a storage unit 205, a mechanism control unit 206, a print job receiving unit 207, an image processing control unit 208, and a printing control unit 209. Each of these units of the printer 11 is achieved by the CPU 1101 or the ASIC 1106 of the printer 11 executing process defined in programs stored in the MEM-P 1102 or the MEM-C 1107.

The system control unit 201 controls the overall operation of the printer 11. The system control unit 201 includes a job information processing unit 211, a rasterized image processing unit 212, and a job information generation unit 213.

The job information processing unit 211 processes job information included in the print job transmitted from the DFE 50. The rasterized image processing unit 212 processes the rasterized image data included in the print job transmitted from the DFE 50. The job information generation unit 213 generates job information for printing the slip sheet in response to receipt of information to be printed on the slip sheet (slip sheet print information) from the inspection device 13. The format of an image to be printed on the slip sheet is determined in advance so as to be determined based on the slip sheet print information. Then, the storage unit 205 stores information indicating a format for printing on the slip sheet. The format may be determined for each type or size of the sheets. Further, the format may be stored in the storage unit 205 in advance or may be transmitted together with a first slip print information by the inspection device 13.

Note that the slip sheet (insertion sheet) may be a sheet such as cut paper that is a conveyable medium by the printer 11. The conveyance medium may be a colored sheet, a blank sheet, or a blank sheet having a size different from the size of the sheet of the print job, a film sheet, a plastic sheet, as long as the conveyance medium has identification information of the slip sheet (conveyance medium) and is stacked in a sheet feeding tray provided for the printer 11, to be conveyed and output according to an output instruction of the slip sheet. The slip sheet is referred to as a second conveyance medium while a printed sheet is referred to as a first conveyance medium as described above. The identification information of the slip sheet (second conveyance medium) is printed by an image forming unit of the printer 11. Alternatively, the identification information may be applied to or printed on the slip sheet in advance, or the size or ejection direction of the sheet may be used as the identification information of the slip sheet (second conveyance medium). The identification information of the slip sheet (second conveyance medium) is an example of "identification information that distinguishes and associates each of the plurality of first conveyance media having defective images stacked on the ejection device, with a corresponding one of the plurality of second conveyance media stacked on the ejection device". In other words, the identification information of the slip sheet (second conveyance medium) is information indicating that the image is formed on each of the plurality of second conveyance media, and each of the plurality of second conveyance media corresponds to each of the plurality of first conveyance media having defects. The image forming unit of the printer 11 controls the printer section 1132 to form an image including the identification information of the second conveyance medium on the second conveyance medium. Accordingly, even when a plurality of defective printed sheets and the plurality of slip sheets corresponding to the defective printed sheets are ejected to an ejection device such as a sheet ejection tray, it is easy for a user to distinguish the slip sheets and confirm the defective printed sheets corresponding to each of the slip sheets.

The display control unit 202 controls to display various types of information including job information on the operation panel 12. The network I/F control unit 203 controls the network I/F 1150 and performs connection control with a communication network. When another device is connected to the printer 11, the external I/F control unit 204 performs connection control with the connected device. The storage unit 205 stores various types of information including job information.

The mechanism control unit 206 controls operations of mechanisms included in the printer 11, such as operations of a mechanism that performs sheet conveyance and operations of a mechanism that performs transfer process in the printer 11 including the printer section 1132. The print job receiving unit 207 receives the print job from the DFE 50. The image processing control unit 208 processes the print image transferred by the mechanism control unit 206. The printing control unit 209 controls image formation on the conveyance medium. The mechanism control unit 206, the image processing control unit 208, and the printing control unit 209 cooperate with each other to function as the image forming unit that forms an image on the conveyance medium. Further, the information acquisition device such as the inline sensor may acquire information on an image based on the image after toner is fixed to the conveyance medium by the fixing roller 117 or based on the image before the conveyance medium enters the fixing roller 117 after the image is transferred by the transfer roller 112.

Figure 7:
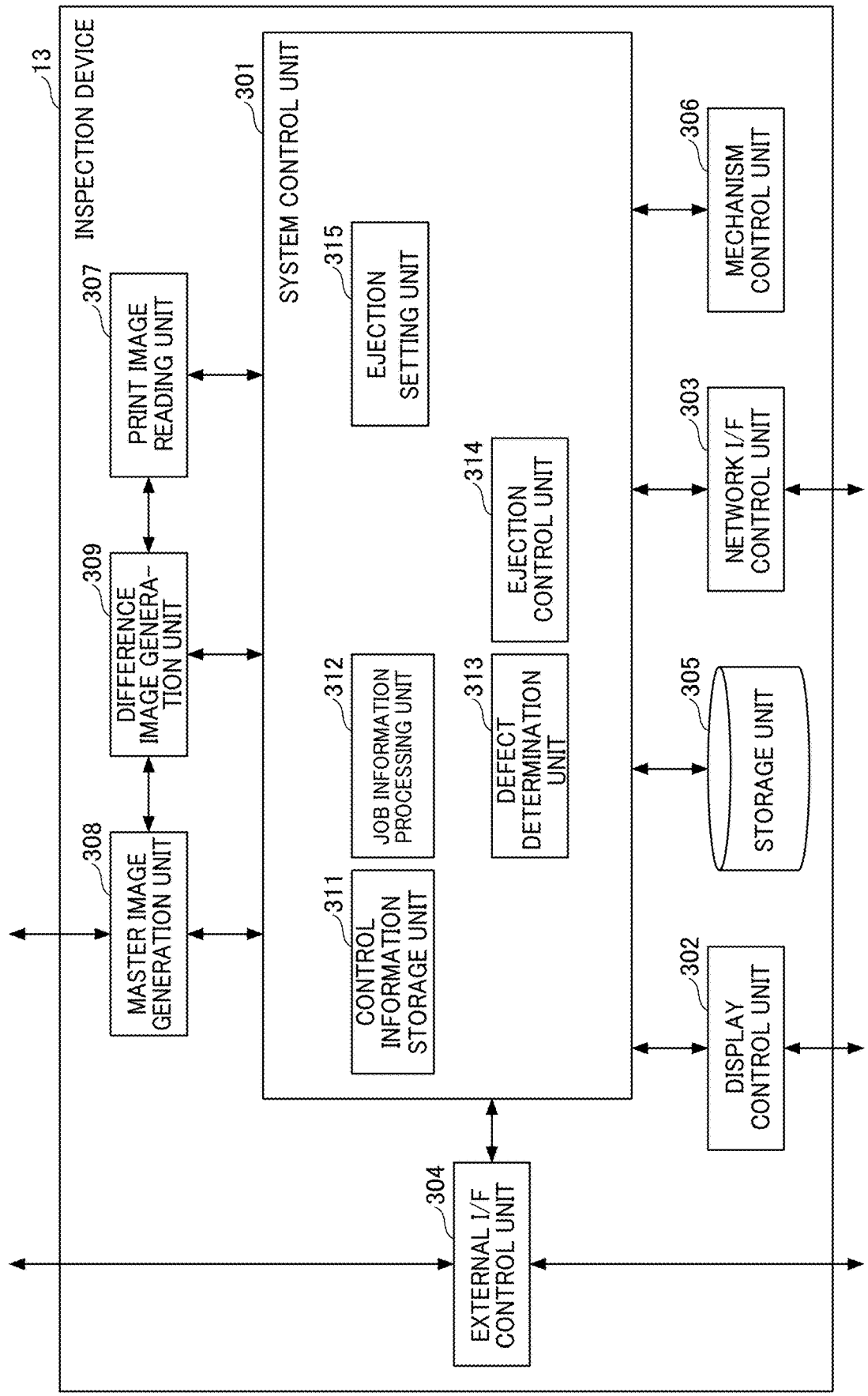
FIG. 7 is a diagram illustrating functions of the inspection device of the image forming apparatus of FIG. 2.

FIG. 7 is a diagram illustrating functions of the inspection device of the image forming apparatus of FIG. 2.

The inspection device 13 includes a system control unit 301, a display control unit 302, a network I/F control unit 303, an external I/F control unit 304, a storage unit 305, a mechanism control unit 306, a print image reading unit 307, a master image generation unit 308, and a difference image generation unit 309. Each of these units is achieved by the CPU 134 or the ASIC 1106 of the inspection device 13 executing processing defined in programs stored in the MEM-P 1102 or the MEM-C 1107 of the inspection device 13.

The system control unit 301 controls the overall operation of inspection device 13. The system control unit 301 includes a control information storage unit 311, a job information processing unit 312, a defect determination unit 313, an ejection control unit 314, and an ejection setting unit 315.

The control information storage unit 311 stores control information controlled by the system control unit 301. Further, the control information storage unit 311 temporarily stores received job information while the job information is an object to be controlled.

The job information processing unit 312 extracts information to be processed by a post-processing device (for example, a device that performs post-processing such as the stacker 14) from job information and transmits the extracted information to the post-processing device via the external I/F control unit 304. Further, the job information processing unit 312 transfers job information excluding information to be processed by the post-processing device, to the master image generation unit 308, the defect determination unit 313, the print image reading unit 307, and the mechanism control unit 306.

The display control unit 302 controls to display various types of information including an inspection result on the operation panel 133 or a different device. The different device includes a terminal device used by a user, such as a personal computer (PC) or a tablet PC, the DFE 50, the printer 11. The display control unit 302 performs process of returning information stored in the inspection device 13 in response to a request from software such as a web browser executing in the different device. Further, the display control unit 302 and software executing in the different device transmit information of the inspection device 13 to the different device using a bidirectional communication protocol such as WebSocket and display the information in real time. For example, when software executing in the different device displays a list of defective printed sheets by accessing the inspection device 13, the list is automatically updated each time a defect occurs, and information of a defective printed sheet or information of the slip sheets is additionally displayed. The display control unit 302 may be included in the inspection device 13 as a web server or may be included in a cloud server that receives information of the inspection result from the inspection device 13. The operation panel 133, a display of the different device, and software such as the web browser are examples of a display unit on which the display control unit 302 of the present disclosure displays information.

The network I/F control unit 303 controls the network I/F 138. The external I/F control unit 304 controls the external I/F 139.

The storage unit 305 stores various types of information. Specifically, job execution history information related to the print job that the control has been ended, and a difference image data indicating the difference between the read image data and the master image data are stored.

The mechanism control unit 306 controls an operation of a mechanism included in the inspection device 13 such as conveyance of the sheet.

The print image reading unit 307 controls the first inline sensor 131 and the second inline sensor 132 to read the image formed on a sheet by the printer 11, and to generate read image data indicating the read image.

The master image generation unit 308 generates master image data based on the rasterized image data. Specifically, the master image generation unit 308 converts rasterized image data in the CMYK format into master image data in the RGB format.

Note that the master image data is data serving as a reference for comparison with the read image data and is used as the correct data when printed correctly. The master image data may be created by reading the sheet on which a reference image is printed with the scanner section 1131, the inline sensor, or a scanner of an external device.

The difference image generation unit 309 generates difference image data indicating a difference between the master image data and the read image data.

The defect determination unit 313 determines whether the printed image has a defect by comparing the difference image data with a predetermined threshold. The threshold is information (value) serving as a criterion for determining that the image has the defect. The defect determination unit 313 refers to the threshold and determines that the image has the defect if the difference image data has an area exceeding the threshold. The threshold is, for example, a value indicating that a difference (comparison result) between density values of each pixel included in the difference image data is equal to or greater than a predetermined density value, or a value indicating an area of a portion where pixels having a difference equal to or greater than the predetermined density value are continuous. The setting of the threshold is changed by the user so that the threshold is increased (the criterion is relaxed) or decreased (the criterion is tightened). A defect refers to a portion of image data determined to be different from an image desired by the user (for example, master image data) when a determination result determined by the defect determination unit 313 exceeds a threshold. The defect includes, for example, a spot, a streak, a positional deviation of the image, a difference in color, and a void in color.

Note that the defect determination method may be a determination method of determining whether the value of a printed image exceeds a set threshold (difference from ideal image data) based on a read image data obtained by reading ideal image data in advance of printing, other than the above-described method of comparing master image data and read image data. Further, before the defect determination processing is performed, correction processing may be performed to increase the accuracy of the determination processing. The correction processing is processing such as skew correction of read image data for correcting read image data of a medium conveyed in a skewed manner to a correct orientation or position, or flare correction for correcting a white light portion in read image data at the time of reading.

When the defect determination unit 313 determines that the image has a defect, the ejection control unit 314 controls to eject the slip sheet (second conveyance medium) indicating that the image has the defect. The slip sheet is a sheet to be inserted between specified sheets of a bundle of printed sheets stacked on the stacker 14 and the slip sheet has an outstanding color tone as described below.

Specifically, when the defect determination unit 313 determines that the image has the defect, the ejection control unit 314 determines whether to insert the slip sheet based on a threshold of an insertion interval set in advance. The threshold of the insertion interval is received by the ejection setting unit 315. When the defect determination unit 313 determines that the slip sheet is inserted, information for printing the slip sheet (slip sheet printing information) is generated and transmitted to the printer 11. As a result, the ejection control unit 314 instructs the image forming unit of the printer 11 to print the image to be printed on the slip sheet. Note that the ejection control unit 314 may instruct the printer 11 to feed a predetermined slip sheet from the sheet feeding tray provided in the printer 11 and eject the slip sheet without printing. The predetermined slip sheet includes, for example, a colored sheet or a sheet having a size different from the size of a sheet used in a print job.

The ejection setting unit 315 receives a setting of an interval for the ejection control of the slip sheet. Specifically, the ejection setting unit 315 receives an input of the above-described threshold. A specific example of a screen for receiving settings is described below.

Descriptions are given of information that the image forming system 1 controls.

FIG. 8 is a diagram for explaining items of job information, according to embodiments of the present disclosure.

The job information 901 is bibliographic information included in print job data generated by the DFE 50 or the printer 11. The job information 901 includes items "JOB GENERATION SOURCE", "GENERATION TIME", "PAGE ID", "PRINT FACE", "SHEET ID", "COPY ID", "JOB ID", "SHEET TYPE", "SHEET SIZE", "JOB TYPE", and "SLIP SHEET ID". The job information 901 is an example of print information for performing printing.

The value of the item "JOB GENERATION SOURCE" is a value indicating the generation source of the print job data and is either a "DFE JOB" or an "INTERNAL JOB". When the job information is included in the print job data to be transmitted to the image forming apparatus 10 by the DFE 50, the value of the item "JOB GENERATION SOURCE" is the "DFE JOB". When the job information generation unit 213 of the printer 11 generates the print job data for the slip sheet, since the print job data is generated inside the image forming apparatus 10, the value of the item "JOB GENERATION SOURCE" is the "INTERNAL JOB".

The value of the item "GENERATION TIME" is a value indicating the time at which the generation source generated the job information.

The value of the item "PAGE ID" is a numerical value to identify the print image and is incremented by one for output of each page starting from activation of the power source. The numerical value is set in the item "PAGE ID" when printing is executed.

The value of the item "PRINT FACE" is a value to identify whether the print image is to be printed on one side in single-sided printing, on the front face in duplex printing (front in duplex), or on the back face in duplex printing (back in duplex).

The value of the item "SHEET ID" is a numerical value to identify a sheet. When the duplex printing is performed, two "PAGE IDs" are given to the same sheet ID. The value of the item "SHEET ID" is incremented by one for process of each page starting from activation of the power source. A numerical value is set in the item "SHEET ID" when printing is executed.

The value of the item "COPY ID" is a numerical value to identify a unit of copy and is incremented by one for output of each copy starting from activation of the power source. A numerical value is set in the item "COPY ID" when printing is executed.

The value of the item "JOB ID" is a numerical value to identify the print job unit and is incremented by one for output of each job starting from activation of the power source. A numerical value is set in the item "JOB ID" when printing is executed.

The value of the item "SHEET TYPE" is a value indicating the type of sheets. The value of the item "SHEET SIZE" is a value indicating the size of the sheets. Note that a sheet to be printed and used as a slip sheet is selectable, depending on the settings, between a sheet used in the print job in which the defect was detected or a sheet stacked on a designated sheet feeding tray. By using a sheet used in the print job for printing an image on the slip sheet, time-consuming process such as readjustment of the fixing temperature does not need to be performed, and the processing time is shortened. Further, when a sheet to be printed and used as a slip sheet is a sheet stacked on the designated sheet feeding tray, an inexpensive sheet is used to be dedicated to the slip sheet, and the cost is reduced.

The value of the item "JOB TYPE" is a value indicating whether the job is a target of defect detection, a non-target of defect detection, or a slip sheet for defect detection identification. When the job information generation unit 213 of the printer 11 generates the print job data for slip sheets, the value of the item "JOB TYPE" is a value indicating a slip sheet for defect detection identification. When the value of the item "JOB TYPE" is a value indicating a non-target of defect detection or a slip sheet for defect detection identification, the defect determination unit 313 does not execute processing.

The value of the item "SLIP SHEET ID" is an identifier to identify the slip sheet. The value of the item "SLIP SHEET ID" is notified from the inspection device 13 to the printer 11. In a case of a job generated by the DFE 50 or a job generated by the printer 11 for other than a slip sheet, a slip sheet ID does not exist. For this reason, the value "−1" is set in the item "SLIP SHEET ID" as a value indicating that a slip sheet ID does not exist.

FIG. 9 is a diagram illustrating pattern information, according to embodiments of the present disclosure.

The pattern information 902 is set in advance and stored in the storage unit 305 or in the control information storage unit 311 of the inspection device 13. The ejection control unit 314 determines a color pattern to be printed on the slip sheet with reference to the pattern information 902. The pattern information 902 includes items "PATTERN NUMBER" and "CONTENTS".

The value of the item "PATTERN NUMBER" is a value indicating the number of each pattern of the pattern information 902. The value of the item "CONTENTS" is a value indicating a combination of colors in each pattern of the pattern information 902.

The control information storage unit 311 stores a pattern number indicating which pattern of the pattern information 902 is referred to by the ejection control unit 314. The initial value of the pattern number is zero when the power source is turned on. The ejection control unit 314 increments by one to a numerical value indicating the pattern number stored in the control information storage unit 311 each time a print job for a slip sheet is generated with reference to the pattern information 902. The numerical value is reset to zero when the numerical value exceeds the maximum value.

The pattern information 902 may be changed by the user. For example, the pattern information 902 may allow the user to change the maximum value of the pattern (for example, 6 patterns in FIG. 9) or the combination of colors corresponding to the pattern number.

FIG. 10 is a first diagram illustrating the slip sheet print information, according to embodiments of the present disclosure.

The slip sheet print information 903 is information indicating a combination of colors to be printed on each slip sheet and includes "SLIP SHEET ID" and "CONTENTS" as items.

The value of the item "SLIP SHEET ID" is an identifier to identify the slip sheet.

The value of the item "CONTENTS" is a value indicating a combination of colors to be printed for each slip sheet.

The slip sheet print information 903 is information generated by the ejection control unit 314 with reference to the pattern information 902. The ejection control unit 314 increments a numerical value indicating the slip sheet ID by one.

Next, descriptions are given of operations of the image forming system 1.

Figure 11:
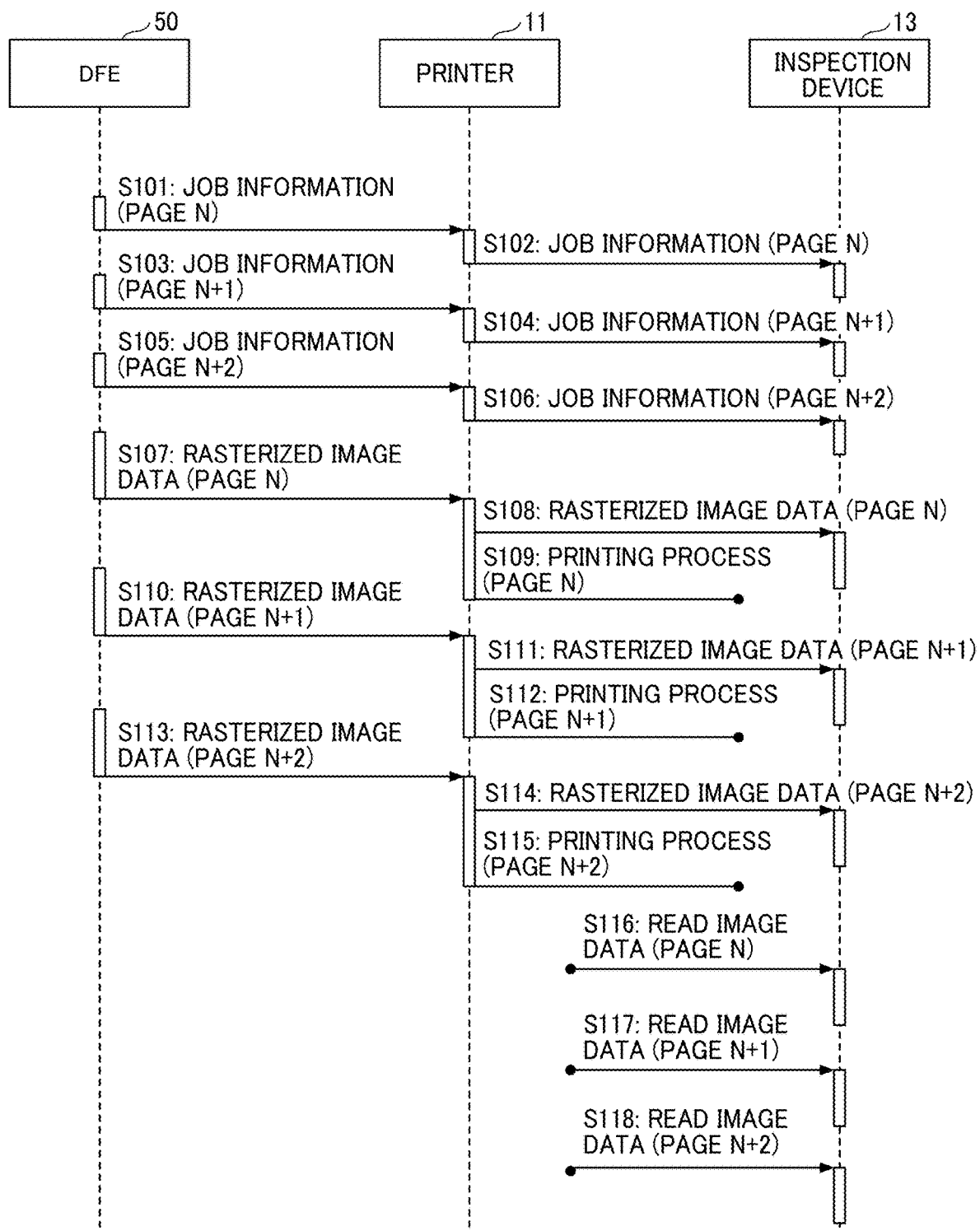
FIG. 11 is a sequence diagram illustrating a flow of print processing without a slip sheet, according to embodiments of the present disclosure.

FIG. 11 is a sequence diagram illustrating a flow of print processing without the slip sheet, according to embodiments of the present disclosure.

When the print job receiving unit 502 of the DFE 50 receives print job data from the user terminal 30 or the management server 40, the job information processing unit 551 generates job information (bibliographic information about the print job) for each page of the print job. Then, in step S101, the print job transmission unit 504 of the DFE 50 transmits job information (for example, page n) to the printer 11.

In step S102, when the print job receiving unit 207 of the printer 11 receives the job information (page n), the job information processing unit 211 of the printer 11 performs processing such as addition of the numerical value indicating the page ID to update the received job information (page n) and transmits the updated job information to the inspection device 13 via the external I/F control unit 204.

When the print job receiving unit 502 of the DFE 50 receives the print job from the user terminal 30 or the management server 40, the rasterized image processing unit 552 of the DFE 50 performs processing of converting each page into the rasterized image data. The job information processing unit 551 and the rasterized image processing unit 552 of the DFE 50 perform processing in parallel, and the job information that completes processing first is transmitted to the printer 11 first. For example, the DFE 50 generates and transmits job information for page n+1 and page n+2 before starting transmission of the rasterized image data (page n). Then, in steps S103 to S106, the printer 11 updates the received job information and transmits the updated job information to the inspection device 13.

Then, the rasterized image processing unit 552 of the DFE 50 generates rasterized image data (page n) corresponding to the job information (page n). In step S107, the print job transmission unit 504 transmits the rasterized image (page n) to the printer 11. In step S108, the rasterized image processing unit 212 of the printer 11 performs processing for the rasterized image data and transmits the processed rasterized image data to the inspection device 13.

The master image generation unit 308 of the inspection device 13 generates master image data (page n) according to the job information (page n) and the rasterized image data (page n). Then, in accordance with the job information, the inspection device 13 associates the order of pages detected by the first inline sensor 131 and the second inline sensor 132 with the generated master image data and stores the association result in the storage unit 305.

In step S109, the image processing control unit 208, the printing control unit 209, and the mechanism control unit 206 of the printer 11 execute print processing in accordance with the job information (page n). The printed sheet (page n) is conveyed to the inspection device 13.

In steps S110 to S115, the DFE 50 and the printer 11 perform processing on the rasterized image (pages n+1 and n+2) in the same way. Then, in steps S116 to S118, the print image reading unit 307 of the inspection device 13 acquires read image data (pages n, n+1, n+2) read by the first inline sensor 131 and the second inline sensor 132.

Subsequently, the difference image generation unit 309 of the inspection device 13 generates difference image data indicating a difference between the master image data and the read image data for each page. The defect determination unit 313 determines whether the image includes any defect based on the generated difference image data and generates defect determination information. Then, the ejection control unit 314 executes inspection processing including an inspection of whether to eject the slip sheet (second conveyance medium). Details of the inspection processing are described below.

Figure 12:
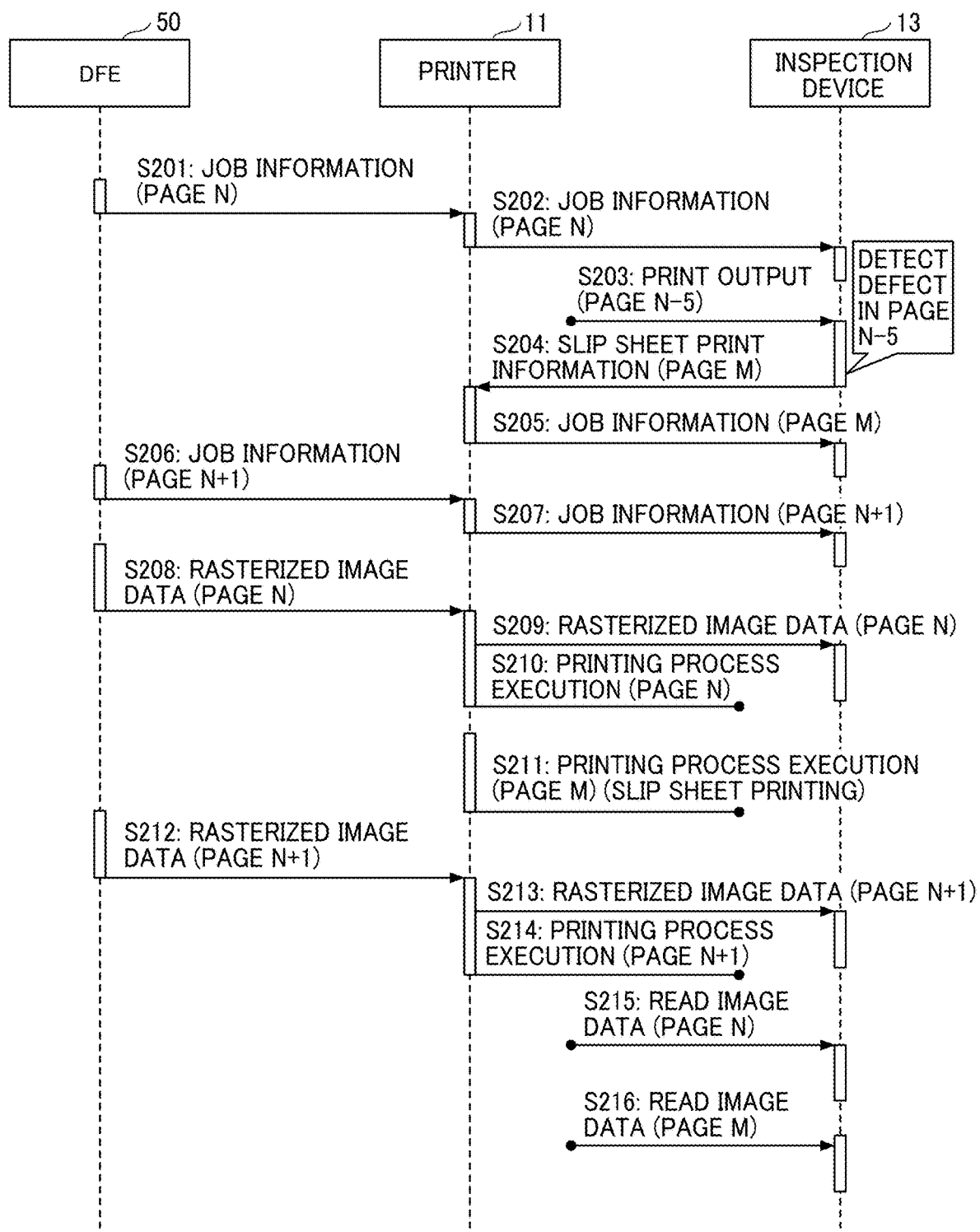
FIG. 12 is a sequence diagram illustrating a flow of the print processing with the slip sheet, according to embodiments of the present disclosure.

FIG. 12 is a sequence diagram illustrating a flow of the print processing with the slip sheet, according to embodiments of the present disclosure.

In the print processing with slip sheet illustrated in FIG. 12, step S201 and step S202 are the same as step S101 and step S102, respectively, of the print processing without slip sheet illustrated in FIG. 11.

In the case the print processing with slip sheet, for example, in step S203, the defect determination unit 313 determines that the image includes a defect for the page n−5 on which print output has already been performed, and the ejection control unit 314 determines that the slip sheet is to be inserted by the inspection processing described below.

The ejection control unit 314 of the inspection device 13 replaces the "sheet count value of the previously inserted slip sheet" stored in the control information storage unit 311 with the "sheet count value" of the sheet currently determined that the sheet has a defect. The "sheet count value of the previously inserted slip sheet" is the number of pages serving as a reference for determining whether the slip sheet is inserted. In step S204, the inspection device 13 transmits the slip sheet print information 903 (page m) to the printer 11.

Based on the received slip sheet print information 903 (page m), the job information generation unit 213 of the printer 11 determines the timing of inserting the slip sheet and generates job information (page m). For example, the timing of inserting the slip sheet may be a timing at which the slip sheet is inserted between page n and page n+1. Then, in step S205, the printer 11 transmits the generated job information (page m) to the inspection device 13.

Step S206 and step S207 illustrated in FIG. 12 are the same as step S103 and step S104, respectively, of the print processing without slip sheet illustrated in FIG. 11.

Further, steps S208 to S210 illustrated in FIG. 12 are the same as steps S107 to S109 of the print processing without a slip sheet as illustrated in FIG. 11.

In step S211, at the timing of inserting a slip sheet (for example, between page n and page n+1), the image processing control unit 208, the printing control unit 209, and the mechanism control unit 206 of the printer 11 execute the print processing (printing of a slip sheet) according to the job information (page m). Note that in the present embodiment, since the slip sheet print job is not a job generated in the DFE 50, the rasterized image data of the slip sheet is not transmitted from the DFE 50 to the printer 11. In step S204, the slip sheet print information 903 for slip sheet printing has already been sent from the inspection device 13 to the printer 11. Note that the slip sheet print information 903 may be configured to be transmitted from the inspection device 13 to the printer 11 via the DFE 50.

Steps S212 to S214 and step S215 illustrated in FIG. 12 are the same as steps S110 to S112 and step S116, respectively, of the print processing without a slip sheet illustrated in FIG. 11.

In step S216, the print image reading unit 307 of the inspection device 13 acquires the read image data (page m) read by the first inline sensor 131 and the second inline sensor 132. In the case of the print job for slip sheet, the master image generation unit 308 of the inspection device 13 does not generate the master image data. The inspection device 13 associates the order of pages detected by the first inline sensor 131 and the second inline sensor 132 with the generated master image data according to the job information of each page including the page m and stores the associated information in the storage unit 305.

When the read image data is based on a slip sheet print job (page m), the inspection device 13 discards the read image data without performing the inspection processing.

Figure 13:
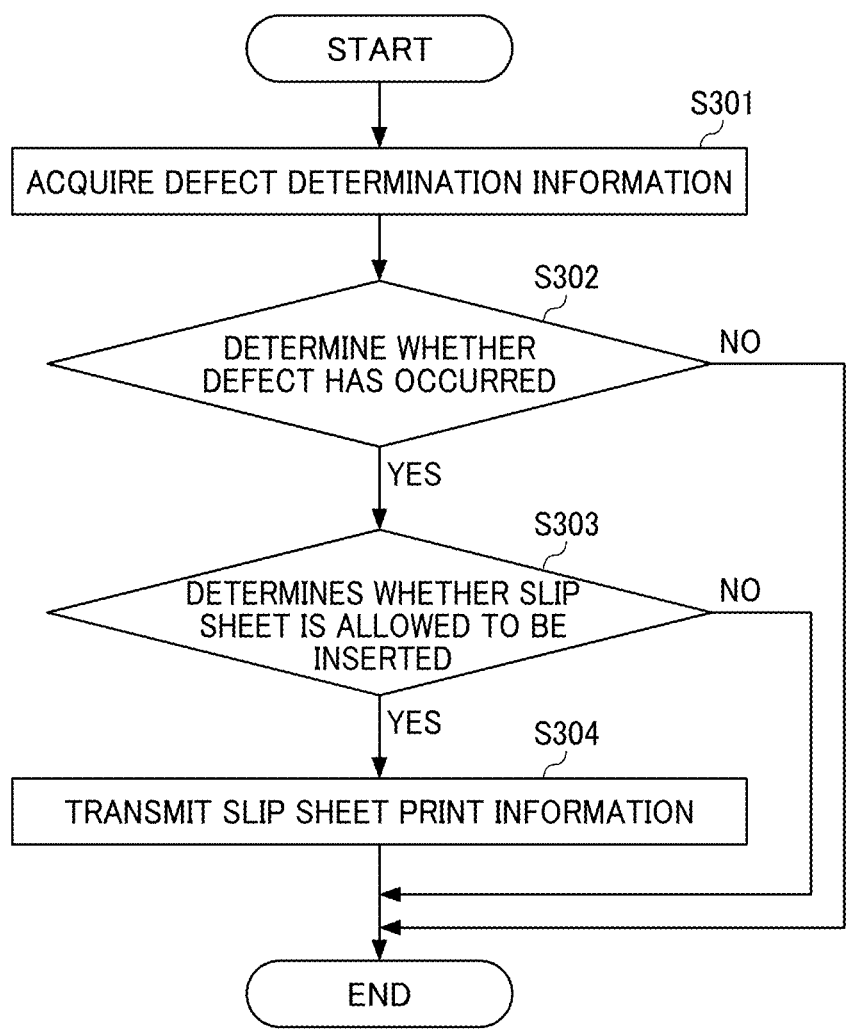
FIG. 13 is a flowchart illustrating a flow of inspection processing, according to embodiments of the present disclosure.

FIG. 13 is a flowchart illustrating a flow of the inspection processing, according to embodiments of the present disclosure.

In step S301, when the inspection processing starts, the ejection control unit 314 acquires the defect determination information. The defect determination information is information generated by the defect determination unit 313 and includes the information of defect determination result per printed page, the sheet count value, and the minimum value of the slip sheet insertion interval.

The sheet count value is set to zero when the power of the image forming apparatus 10 is turned on. The sheet count value is incremented by one each time the print sheet is ejected to the stacker 14. The minimum value of the slip sheet insertion interval is set in advance in response to an operation performed by a user on the operation panel 133 of the inspection device 13.

In step S302, the ejection control unit 314 determines the presence or absence of the defect with reference to the defect determination result included in the defect determination information. When it is determined that there is no defect (NO in step S302), the ejection control unit 314 ends the inspection processing.

In step S303, when it is determined that there is a defect (YES in step S302), the ejection control unit 314 determines whether the slip sheet is inserted. Specifically, when the following Equation 1 is satisfied, the ejection control unit 314 determines that the slip sheet is allowed to be inserted.

$$\text{The minimum value of the slip sheet insertion interval} < \text{Sheet count value} - \text{Sheet count value of the previously inserted slip sheet} \quad \text{Equation 1.}$$

However, when the sheet count value of the previously inserted slip sheet is zero, the ejection control unit 314 determines that the slip sheet is allowed to be inserted regardless of whether Equation 1 is satisfied or not.

That is, when it is determined that there is a defect in the printed sheet, the ejection control unit 314 determines that the slip sheet is allowed to be inserted in the following two cases. The first case is when the sheet count value (the number of output pages of the defective sheet) of the current sheet determined to be defective is larger than the sheet count value of the slip sheet (the number of output pages of the slip sheet) at the previous insertion of the slip sheet and is greater than a predetermined insertion interval. The second case is when the slip sheet has not been inserted yet.

The determination method is not limited to the above-described method. The following method may be employed as an alternative method. When the ejection control unit 314 has determined that there is a defect in the image of the first conveyance medium, in a case where the ejection of the first conveyance medium determined to be defective is after the second conveyance medium is ejected and the value of the slip sheet insertion interval is equal to or smaller than the set interval, the second conveyance medium is not ejected even if the image of the first conveyance medium has a defect. On the other hand, when the value of the slip sheet insertion interval is greater than the set interval, the second conveyance medium is ejected when the ejection control unit 314 has determined that the first conveyance medium is defective. At this time, the display control unit 302 displays information of the defective first conveyance medium ejected after the second conveyance medium previously ejected, in association with information of the second conveyance medium to be currently ejected.

The sheet count value of the previously inserted slip sheet is stored in the control information storage unit 311 and is set to zero when the power of the image forming apparatus 10 is turned on.

When the ejection control unit 314 determines that the slip sheet is not allowed to be inserted (NO in step S303), the ejection control unit 314 ends the inspection processing. When it is determined that the slip sheet is inserted (YES in step S303), the ejection control unit 314 replaces the "sheet count value of the previously inserted slip sheet" stored in the control information storage unit 311 with the "sheet count value", and transmits the slip sheet print information 903, in step S304.

When the slip sheet is not allowed to be inserted, the ejection control unit 314 may wait until suitable timing for inserting the slip sheet and then insert the slip sheet again. That is, the timing at which the slip sheet is inserted is indicated by interrupting again the print job in which the slip sheet is not allowed to be inserted. Due to the above-described configuration, the slip sheet is allowed to be inserted each time the defect is found.

FIG. 14 is a diagram illustrating the slip sheet, according to embodiments of the present disclosure.

A slip sheet ID 905 is printed on the slip sheet 904, for example, at two upper and lower positions. Images of colors specified in the pattern information 902 are alternately printed as pattern images 906 on the outer circumferential portion of the slip sheet 904. The slip sheet ID and the pattern images 906 are an example of identification information to identify the slip sheet (second conveyance medium). Alternatively, the identification information may be a mark or a pattern.

FIG. 15 is a diagram illustrating a defect display screen, according to embodiments of the present disclosure. The display screen illustrated in FIG. 15 and the subsequent drawings are screens displayed on a display unit by the display control unit 302 transmitting screen information in response to a request received from the display unit such as an operation panel of an apparatus or a web browser of another apparatus. The display control unit 302 may display screen information on the display unit by bidirectional communication or push transmission.

A defect display screen 907 is a screen displayed on the operation panel 133 of the inspection device 13 in order to display the detected defects. The defect display screen 907 includes a "JOB LIST" display area 908, a "DEFECT DETECTION PAGE LIST" display area 909, and a "DEFECT DETECTION IMAGE" display area 910.

FIG. 16 is a diagram illustrating a job list, according to embodiments of the present disclosure.

The job list displayed in the "JOB LIST" display area 908 includes items "INSPECTION PROCESSING START TIME", "NUMBER OF COPIES OF JOB", "NUMBER OF PAGES OF JOB", and "NUMBER OF DEFECT-DETECTED PAGES OF JOB". The job list may include identification information to identify the job, such as job names or job IDs, with which a plurality of jobs is confirmed and identified.

The value of the item "INSPECTION PROCESSING START TIME" is a value indicating the start time of the inspection processing of the first page of the print job.

The value of the item "NUMBER OF COPIES OF JOB" is a value indicating the number of copies output in the print job.

The value of the item "NUMBER OF PAGES OF JOB" is a value indicating the number of pages included in the print job.

The value of the item "NUMBER OF DEFECT-DETECTED PAGES OF JOB" is a value indicating the number of pages with defects detected in the print job.

FIG. 17 is a first diagram illustrating a defect detection page list according to the first embodiment of the present disclosure.

The defect detection page list displayed in the "DEFECT DETECTION PAGE LIST" display area 909 includes items "DEFECT DETECTION TIME", "NUMBER OF DEFECTIVE COPIES OCCURRED IN JOB", "NUMBER OF DEFECTIVE PAGES OCCURRED IN JOB", "NEARBY SLIP SHEET ID", "COLOR PATTERN OF NEARBY SLIP SHEET", and "RELATION OF POSITIONS OF DEFECT DETECTED PAGE AND SLIP SHEET".

The value of the item "DEFECT DETECTION TIME" is a value indicating the time at which the defect was detected for each page.

The value of the item "NUMBER OF DEFECTIVE COPIES OCCURRED IN JOB" is a value indicating the number of copies where the defect has occurred.

The value of the item "NUMBER OF DEFECTIVE PAGES OCCURRED IN JOB" is a value indicating the number of pages where the defect has occurred.

The value of the item "NEARBY SLIP SHEET ID" is a value indicating the slip sheet ID of the slip sheet stacked nearby the page in which the defect is detected. Specifically, the nearby slip sheet ID is a slip sheet ID of a slip sheet determined to be inserted due to detection of the defect.

The value of the item "COLOR PATTERN OF NEARBY SLIP SHEET" is a value indicating a color pattern of the outer circumferential portion printed on the slip sheet stacked nearby the page in which the defect is detected. Note that at least one of the pattern image 906 of a color, the mark, the pattern, or the slip sheet ID is printed on the slip sheet as identification information to identify the slip sheet (second conveyance medium). Due to the identification information to identify the slip sheet (second conveyance medium), when the plurality of slip sheets is output, a user easily finds the specific slip sheet and easily reaches the defective sheet. The identification information of the slip sheet (second conveyance medium) is information to be printed on the slip sheet so as to be visible from the lateral side or the top of the ejection device such as the stacker 14 when the slip sheet is ejected in the ejection device and stacked between the printed sheets. The identification information is printed on an edge portion, a surround portion, or a corner of the slip sheet without borders or margins and is visually recognized even when the slip sheet overlaps with the printed sheets. Note that the identification information in the present disclosure is not limited to the above-described example, and includes information configured by a design of patterns or colors.

The value of the item "RELATION OF POSITIONS OF DEFECT DETECTED PAGE AND SLIP SHEET" is a value indicating the relation between the position of the printed page on which the defect is detected and the position at which the slip sheet is stacked. The relation of positions of the defect detected page and the slip sheet indicates the number of sheets that are sandwiched between the slip sheets and the defect detection face of the defect detected page (upper face or lower face). Note that the "DEFECT DETECTION PAGE LIST" display area 909 displaying the defect detection page list may further display identification information of the defective sheet such as the page ID or the sheet ID, or information included in the job information of FIG. 8 such as the job ID, in association with each defect detection sheet.

The display control unit 302 displays identification information of the second conveyance medium (such as the pattern image of the slip sheet or the slip sheet ID), the information of the defective first conveyance medium (such as the defect occurrence information or the page ID of the defective sheet), and the information indicating the relation of stacked positions between the defective first conveyance medium and the second conveyance medium. The above-described information displayed by the display control unit 302 is another example of "identification information that distinguishes and associates each of the plurality of first conveyance media having defective images stacked on the ejection device, with a corresponding one of the plurality of second conveyance media stacked on the ejection device". For example, the information in each row of the defect detection page list is the "identification information that distinguishes and associates each of the plurality of first conveyance media having defective images stacked on the ejection device, with a corresponding one of the plurality of second conveyance media stacked on the ejection device". Further, the "identification information that distinguishes and associates each of the plurality of first conveyance media having defective images stacked on the ejection device, with a corresponding one of the plurality of second conveyance media stacked on the ejection device" may include both information displayed by the display control unit 302 and identification information of the slip sheet on which the image is to be formed. Due to the above-described configuration, after viewing the displayed information, the user visually recognizes the information printed on the slip sheet stacked on the ejection device, easily distinguishes and confirms the plurality of slip sheets, and easily finds the specific defective sheet that the user seeks.

Figure 18:
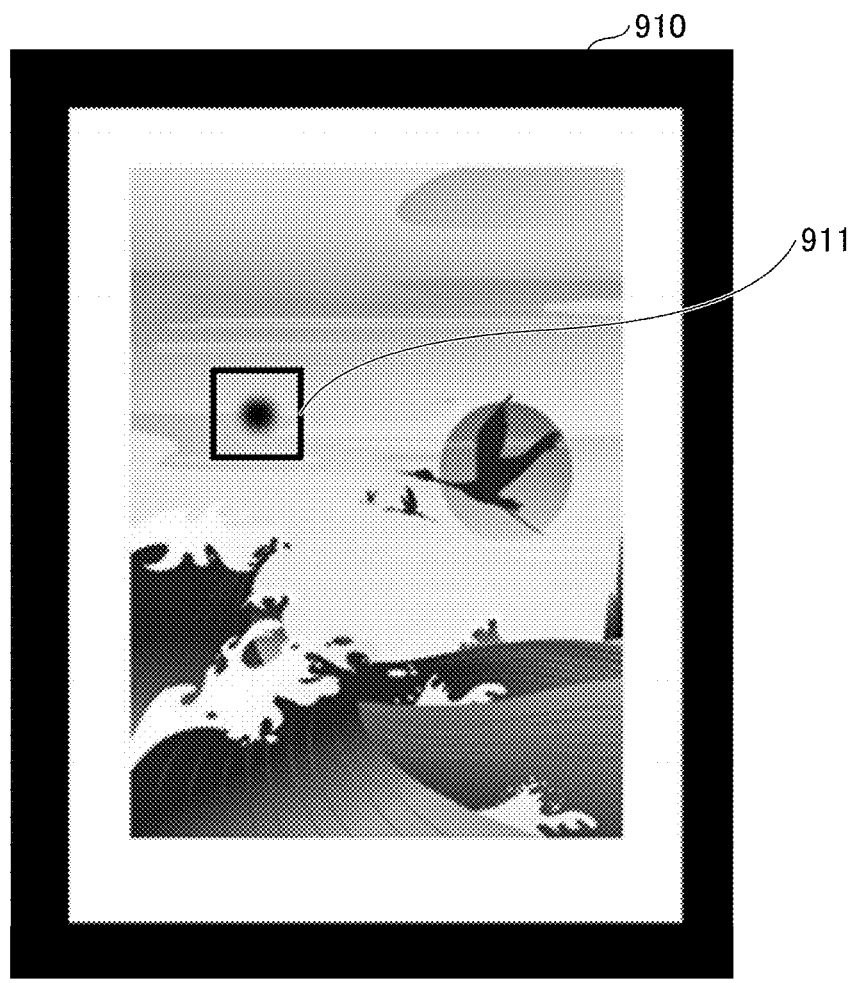
FIG. 18 is a diagram illustrating a defect detection image according to the first embodiment.

FIG. 18 is a diagram illustrating a defect detection image according to the first embodiment.

The "DEFECT DETECTION IMAGE" display area 910 in FIG. 18 displays read image data of a printed page designated in the defect detection page list illustrated in FIG. 17 to which a display 911 indicating the defect detection portion is added.

FIG. 19 is a second diagram illustrating the defect detection page list according to the first embodiment.

As illustrated in FIG. 19, the display control unit 302 of the inspection device 13 displays the defect detection page list that does not include the items related to the slip sheet immediately after detecting the first page with the defect.

FIG. 20 is a third diagram illustrating the defect detection page list according to the first embodiment.

The display control unit 302 of the inspection device 13 receives the slip sheet job information from the printer 11. When the "JOB TYPE" included in the slip sheet job information is "SLIP SHEET FOR DEFECT DETECTION IDENTIFICATION", the display control unit 302 of the inspection device 13 sets the value of the item "SLIP SHEET ID" included in the job information to the value of the item "NEARBY SLIP SHEET ID" in response to the receipt of the slip sheet job information from the printer 11. Further, the display control unit 302 sets a mark of a color corresponding to the value of the item "CONTENTS" of the slip sheet print information 903 to the value of the item "COLOR PATTERN OF NEARBY SLIP SHEET" and then sets the relation of stacking positions between the slip sheet and the printed page in which the defect is detected to the value of the item "RELATION OF POSITIONS OF DEFECT DETECTED PAGE AND SLIP SHEET" to update the display contents.

Figure 21:
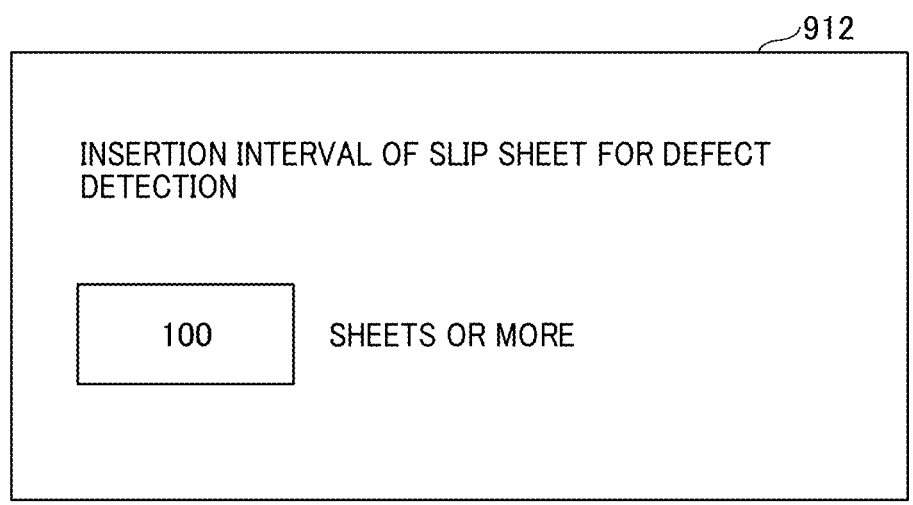
FIG. 21 is a diagram illustrating a setting screen of an insertion interval of the slip sheet according to the first embodiment.

FIG. 21 is a diagram illustrating a setting screen of an insertion interval of the slip sheet according to the first embodiment.

The setting screen 912 is a screen via which the ejection setting unit 315 receives a setting of the insertion interval of the slip sheet. The setting screen 912 is a screen used by the display control unit 302 of the inspection device 13. The number of printed sheets to be output is input as insertion interval on the setting screen 912. When the ejection setting unit 315 receives the setting, the storage unit 305 stores information indicating the insertion interval of the slip sheet. Since the ejection setting unit 315 receives the setting, the printer 11 does not eject the slip sheet even if the defect is detected during the slip sheet insertion interval after the previous slip sheet is ejected. Note that the insertion interval of the slip sheet may be set based on the number of outputs (printed sheets), an output time (period), or the number of jobs.

FIG. 22 is a fourth diagram illustrating the defect detection page list according to the first embodiment.

As another example of display of the defect detection page list, the display control unit 302 may form a slip sheet image using color information and display the slip sheet image as the value of the item "COLOR PATTERN OF NEARBY SLIP SHEET". In addition, the display control unit 302 may display the color name in text character as the value of the item "COLOR PATTERN OF NEARBY SLIP SHEET". Although FIG. 22 illustrates an example in which the defect detection page list is displayed so that rows are added downward in the order of detection, the defect detection page list may be displayed so that rows are added upward in the order of detection along with the manner of accumulation of the sheets on the stacker 14.

Figure 23:
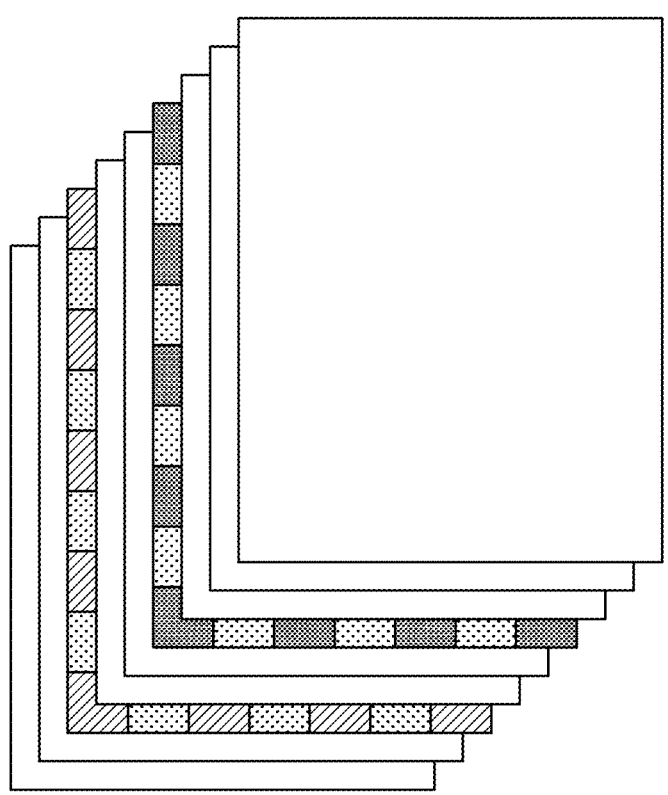
FIG. 23 is a diagram illustrating an appearance of ejected sheets according to the first embodiment.

FIG. 23 is a diagram illustrating an appearance of ejected sheets according to the first embodiment.

The ejected sheets are stacked on the stacker 14. While the outer circumferential portion of a sheet generally has a single color such as white, the outer circumferential portion of the slip sheet has a pattern of two colors alternately printed, so that the slip sheet is found immediately. Further, even when the plurality of slip sheets is printed, the user easily distinguishes the slip sheets having patterns with different colors. Further, the user immediately finds the target slip sheet from the color pattern displayed on the operation panel 133 as the value of the item "COLOR PATTERN OF NEARBY SLIP SHEET" of the defect detection page list.

In order to prompt the user to find the defective first conveyance medium, for example, it is effective to stack a second conveyance medium such as the slip sheet at a position adjacent to the defective first conveyance medium. However, in this method, in order to eject the first conveyance medium after the defect determination is completed, a physical portion such as a conveyance passage having a sufficient length for obtaining a time for defect detection is to be provided, and it is difficult to achieve this configuration.

Further, when the number of the stacked conveyance media is very large, it is difficult to find out the defective first conveyance medium by simply displaying the position where the defective first conveyance medium is stacked.

On the other hand, according to the image forming system 1 of the present embodiment, the second conveyance medium such as the slip sheet and the defective first conveyance medium do not have to be adjacent to each other, and thus a physical portion such as the conveyance passage having the sufficient length as described above is not to be provided.

Further, since the relation of the positions of the defect detected page and the slip sheet is displayed on the operation panel as the value of the item "RELATION OF POSITIONS OF DEFECT DETECTED PAGE AND SLIP SHEET" of the defect detection page list, the user is prompted to find the defect detected sheet by counting the number of sheets from the slip sheet found by the user. Since the number of sheets between the slip sheet and the defective sheet is relatively small in general, it is not difficult to count the number of sheets.

As described above, the image forming system 1 of the present embodiment prompts the user to find the defective first conveyance medium.

Second Embodiment

Next, descriptions are given of the image forming system 1 according to a second embodiment of the present disclosure, with reference to the drawings. The configuration of the second embodiment is basically similar to the configuration of the first embodiment. Different from the first embodiment, in the configuration of the image forming system 1 according to the second embodiment, a slip sheet that has already been printed to indicate a defect is used to display the defect in subsequent printing. Thus, in the following description of the second embodiment, differences from the first embodiment are mainly described. The components of the second embodiment having the same functional configurations as the components of the first embodiment are denoted by the same reference numerals used in the description of the first embodiment, and descriptions of the components similar to the first embodiment are omitted in the second embodiment.

FIG. 24 is a first diagram illustrating the defect detection page list according to a second embodiment of the present disclosure.

The ejection control unit 314 according to the present embodiment uses the slip sheet that has already been printed to indicate the defect to display the defect of subsequent printing. Specifically, as illustrated in FIG. 24, the display control unit 302 displays the relation of the positions of the defect detected page and the slip sheet already ejected not only for a first defect (first entry in FIG. 24) that triggered the ejection of the slip sheet ID but also for a second defect (second entry in FIG. 24) detected after the detection of the first defect. The relation of positions of the defect detected page and the slip sheet already ejected is displayed even the ejection control unit 314 determines that the slip sheet is not to be inserted at the time of the detection of the second defect (NO in step S303 in FIG. 11).

As a result, the same slip sheet ID (for example, 0001) is included in a plurality of entries (for example, the first entry and the second entry in FIG. 24) in the defect detection page list.

When correspondence between the slip sheet and the defect detection page is one-to-many, it is to determine which slip sheet corresponds to each defect detection page is used to display the relation of positions of the defect detection page and the slip sheet. Then, the display control unit 302 specifies the slip sheet stacked closest to the defect detection page. Specifically, the display control unit 302 calculates the number of sheets between the slip sheet stacked on the stacker 14 and the defect detection page based on the job information for the printed slip sheet received from the printer 11, and then specifies the slip sheet having the smallest calculated number of sheets as the closest slip sheet. Thus, the slip sheet ID of the slip sheet specified in this manner is displayed as the value of the item "NEARBY SLIP SHEET ID" of the defect detection page list.

FIG. 25 is a second diagram illustrating the defect detection page list according to the second embodiment.

In the present embodiment, the display control unit 302 may form a slip sheet image using color information and display the slip sheet image as the value of the item "COLOR PATTERN OF NEARBY SLIP SHEET" as in the same manner in FIG. 22. Further, the display control unit 302 may display the color name in text character as the value of the item "COLOR PATTERN OF NEARBY SLIP SHEET". Although FIG. 25 illustrates an example in which the defect detection page list is displayed so that rows are added downward in the order of detection, the defect detection page list may be displayed so that rows are added upward in the order of detection in accordance with images stacked on the stacker 14.

According to the image forming system 1 of the present embodiment, the slip sheet that has already been printed to indicate the defect is used to display the defect in subsequent printing. Due to the above-described configuration, a plurality of defective portions is displayed with one slip sheet, and even when the plurality of defects occurs, the number of slip sheets to be inserted is determined appropriately.

Each of the above-described embodiments describes the examples in which the image forming apparatus 10 performs printing on the slip sheet. As a result, generating a slip sheet with an outstanding color tone using inexpensive sheets is achieved, configuration changes such as changes in color patterns is flexibly achieved, and saving the effort of separately preparing sheets for the slip sheet. Pre-printed sheets or materials other than sheets may be ejected as defect indicators. For example, the slip sheet ID may be written in a bundle of the plurality of sheets, the plurality of sheets may be placed on the sheet feeding tray so as to be ejected in the order of the slip sheet IDs, and the slip sheet fed from the sheet feeding tray may be inserted into the printed sheets. As a result, the printing cost of the slip sheet is reduced.

In each of the above-described embodiments, the DFE 50, the inspection device 13 and the printer 11 are configured to share the above-described processing steps in various combinations. Further, the elements of the DFE 50, the inspection device 13 and the printer 11 may be integrated into one apparatus or may be separately disposed in a plurality of different apparatuses.

For example, the above-described embodiments describe the examples in which the inspection device 13 generates the slip sheet print information 903 and the printer 11 generates print job data for the slip sheet based on the slip sheet print information 903. As a result, the inspection device 13 reduces the load of processing other than inspection and avoids a delay in the speed of inspection. However, the inspection device 13 may generate print job data for the slip sheet and transmit the print job data to the printer 11. In this case, the inspection device 13 generates image data for slip sheet printing in a format such as portable document format (PDF) and transmits the image data to the printer 11. Due to the above-described configuration, the printer 11 does not include a special mechanism for printing on a slip sheet, thus a system is easily introduced.

In an embodiment, the DFE 50 or the inspection device 13 may be configured as an information processing system including a plurality of computing devices such as a server cluster. The plurality of computing devices is configured to communicate with one another via any type of communication link, including a network or shared memory to implement the processing described in the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

In the above-described embodiments, the stacker 14 includes one sheet ejection tray 141. However, in other embodiments, the stacker 14 may include the plurality of sheet ejection trays 141. For example, the stackers 14 and the sheet ejection trays 141 illustrated in FIGS. 26 to 29 are configured to eject and stack printed sheets and slip sheets and are examples of the ejection device according to the present disclosure. In the ejection and stacking method illustrated in FIG. 26, printed sheets and slip sheets are collectively ejected onto one sheet ejection tray 141. Thus, even in the ejection, a plurality of printed sheets having defects and the plurality of slip sheets are easily distinguished from each other.

Further, when the sheets are collectively ejected to one sheet ejection tray, the plurality of printed sheets having defects are included across the plurality of jobs or a plurality of copies of the same job which are continuously ejected. However, the user easily grasps the position of the defective sheet by ejecting the plurality of slip sheets that is distinguished from each other even if a relatively large number of sheets is ejected. Further, as illustrated in FIG. 27, the slip sheets and the printed sheets may be separately ejected to the plurality of sheet ejection trays 141. Further, for example, as illustrated in FIG. 28, the slip sheet ejected to the upper sheet ejection tray 141 may indicate that the image that has the defect in the printed sheets of the lower sheet ejection tray 141.

Further, in a case where sheets are ejected to the plurality of sheet ejection trays 141, the sheets are ejected separately to the sheet ejection trays 141 for each print job. In this case, as illustrated in FIG. 29, when the slip sheet is ejected to the uppermost position of the sheet ejection trays 141, the slip sheet is not overlaid by the upper printed sheets, and the visibility of the slip sheet is enhanced, so that the slip sheet is more easily found. In this case, when the slip sheet is not ejected at the uppermost position (the lowermost sheet ejection tray 141 in FIG. 29), the user finds that no defective sheet has been detected in the print job, thereby enhancing the workability.

In addition, as illustrated in FIG. 30, in the case where sheets are separately ejected to the plurality of sheet ejection trays 141, the display control unit 302 may display identification information (tray A, tray B) of the ejected sheet ejection tray 141 or the level of sheet ejection tray (the first tray from the top, the second tray from the top) for each cover of printed sheets with defects. This configuration indicates the sheet ejection tray 141 to which each of the defective sheet and the slip sheet is ejected.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An image processing system comprising:
an image former to form an image based on print information, on a first conveyance medium;
a sensor to acquire information about the image formed on the first conveyance medium by the image former;
processing circuitry configured to cause a second conveyance medium to be ejected in a case where the image formed on the first conveyance medium is a defective image, based on the information acquired by the sensor; and
an ejector to stack the first conveyance medium and the second conveyance medium,
the processing circuitry being configured to control display of identification information that distinguishes and associates each one of a plurality of first conveyance media having defective images stacked on the ejector, with a corresponding one of a plurality of second conveyance media stacked on the ejector,
wherein the processing circuitry is configured to receive a setting of an interval of ejection of the second conveyance medium,
wherein the processing circuitry is configured to:
in response to a determination that the image on the first conveyance medium is a defective image, hold ejection of the second conveyance medium in a case where the first conveyance medium having the defective image is to be ejected after ejection of the second conveyance medium and an insertion interval of the second conveyance medium is equal to or smaller than the interval of the setting received; and
cause the second conveyance medium to be ejected after the determination, in a case where the first conveyance medium having the defective image is to be ejected after ejection of the second conveyance medium and the insertion interval of the second conveyance medium is greater than the interval of the setting received, and
wherein the processing circuitry is configured to control display of information of a first conveyance medium having a defective image having been ejected after previous ejection of a second conveyance medium, in association with information of the second conveyance medium to be currently ejected.

2. The image processing system according to claim 1,
wherein the processing circuitry is configured to:
determine whether the image formed on the first conveyance medium is a defective image, based on the information acquired by the sensor; and
control ejection of the second conveyance medium in response to a determination that the image formed on the first conveyance medium is a defective image.

3. The image processing system according to claim 1,
wherein the processing circuitry is configured to control display of information indicating a relation of stacking positions between each one of the plurality of first conveyance media having defective images and the corresponding one of the plurality of second conveyance media.

4. The image processing system according to claim 1,
wherein the processing circuitry is configured to control display of information indicating a relation of positions of one of the plurality of first conveyance media having defective images and a corresponding one of the plurality of second conveyance media, the information including a number of first conveyance media stacked between the one of the plurality of first conveyance media having defective images and the corresponding one of the plurality of second conveyance media.

5. The image processing system according to claim 1,
wherein the image former forms an image on a conveyance medium to generate the second conveyance medium.

6. The image processing system according to claim 5,
wherein the image former forms an identification image including the identification information on each one of the plurality of second conveyance media associated with the plurality of first conveyance media having defective images, and wherein the identification information includes identification information of the second conveyance medium indicating that each one of the plurality of second conveyance media is associated with the corresponding one of the plurality of first conveyance media having defective images.

7. The image processing system according to claim 6, wherein the identification image including the identification information of the second conveyance medium is formed on the second conveyance medium such that the identification image is visible from a lateral side of the ejector when the second conveyance medium is ejected to the ejector.

8. The image processing system according to claim 6, wherein the identification information that distinguishes and associate each one of the plurality of first conveyance media having defective images on the ejector, with the corresponding one of the plurality of second conveyance media on the ejector includes the identification information of the second conveyance medium, information of the first conveyance medium having a defective image, and information indicating a relation of stacked positions between the first conveyance medium having the defective image and the second conveyance medium, displayed by the processing circuitry.

9. The image processing system according to claim 5, wherein the processing circuitry is configured to determine a combination of colors included in an image to be formed on the second conveyance medium as the identification information of the second conveyance medium.

10. The image processing system according to claim 9, wherein the processing circuitry is configured to instruct the image former to form an image including the identification information of the second conveyance medium, on the second conveyance medium.

11. The image processing system according to claim 9, wherein the processing circuitry is configured to control display of a color included in the image formed on the second conveyance medium.

12. The image processing system according to claim 1, wherein the processing circuitry is configured to set the interval of ejection of the second conveyance medium from a number of outputs of the first conveyance medium, an output time of the first conveyance medium, or a number of print jobs.

13. An inspection device comprising:
a sensor to acquire information about an image formed on a first conveyance medium; and
processing circuitry configured to:
cause a second conveyance medium to be ejected in a case where the image formed on the first conveyance medium is a defective image, based on the information acquired by the sensor;
control display of identification information that distinguishes and associates each one of a plurality of first conveyance media having defective images ejected, with a corresponding one of a plurality of second conveyance media ejected;
receive a setting of an interval of ejection of the second conveyance medium;
in response to a determination that the image on the first conveyance medium is a defective image, hold ejection of the second conveyance medium in a case where the first conveyance medium having the defective image is to be ejected after ejection of the second conveyance medium and an insertion interval of the second conveyance medium is equal to or smaller than the interval of the setting received; and cause the second conveyance medium to be ejected after the determination, in a case where the first conveyance medium having the defective image is to be ejected after ejection of the second conveyance medium and the insertion interval of the second conveyance medium is greater than the interval of the setting received; and
control display of information of a first conveyance medium having a defective image having been ejected after previous ejection of a second conveyance medium, in association with information of the second conveyance medium to be currently ejected.

14. An inspection method to be performed by a computer, the inspection method comprising:
acquiring information about an image formed on a first conveyance medium;
ejecting a second conveyance medium in a case where the image formed on the first conveyance medium is a defective image based on the information acquired by the acquiring;
displaying identification information that distinguishes and associates each one of a plurality of first conveyance media having defective images ejected, with a corresponding one of a plurality of second conveyance media ejected;
receiving a setting of an interval of ejection of the second conveyance medium;
in response to a determination that the image on the first conveyance medium is a defective image, holding ejection of the second conveyance medium in a case where the first conveyance medium having the defective image is to be ejected after ejection of the second conveyance medium and an insertion interval of the second conveyance medium is equal to or smaller than the interval of the setting received; and causing the second conveyance medium to be ejected after the determination, in a case where the first conveyance medium having the defective image is to be ejected after ejection of the second conveyance medium and the insertion interval of the second conveyance medium is greater than the interval of the setting received; and
controlling display of information of a first conveyance medium having a defective image having been ejected after previous ejection of a second conveyance medium, in association with information of the second conveyance medium to be currently ejected.

\* \* \* \* \*